United States Patent
Tatebayashi et al.

(10) Patent No.: US 8,920,958 B2
(45) Date of Patent: Dec. 30, 2014

(54) NONAQUEOUS ELECTROLYTE BATTERY, BATTERY PACK AND VEHICLE

(75) Inventors: Yoshinao Tatebayashi, Yokohama (JP); Hiroki Inagaki, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1574 days.

(21) Appl. No.: 11/436,725

(22) Filed: May 19, 2006

(65) Prior Publication Data
US 2007/0196732 A1 Aug. 23, 2007

(30) Foreign Application Priority Data
Feb. 22, 2006 (JP) .................. 2006-045381

(51) Int. Cl.
| | |
|---|---|
| H01M 2/00 | (2006.01) |
| H01M 2/26 | (2006.01) |
| H01M 2/30 | (2006.01) |
| B60L 11/00 | (2006.01) |
| H01M 10/04 | (2006.01) |
| B60L 11/18 | (2006.01) |
| H01M 10/0585 | (2010.01) |
| B60L 11/12 | (2006.01) |
| H01M 2/22 | (2006.01) |

(52) U.S. Cl.
CPC .......... *H01M 10/0585* (2013.01); *H01M 2/266* (2013.01); *Y02T 90/14* (2013.01); *Y02T 10/7077* (2013.01); *Y02T 90/128* (2013.01); *H01M 2/30* (2013.01); *B60L 11/007* (2013.01); *B60L 2200/12* (2013.01); *H01M 10/0436* (2013.01); *Y02T 10/7005* (2013.01); *B60L 11/1879* (2013.01); *H01M 2/263* (2013.01); *Y02T 10/705* (2013.01); *B60L 11/185* (2013.01); *B60L 11/123* (2013.01); *Y02T 10/7088* (2013.01); *Y02E 60/122* (2013.01); *Y02T 10/6217* (2013.01); *H01M 2/22* (2013.01); *B60L 11/1877* (2013.01)

USPC .......... 429/129; 429/131; 429/127; 429/153; 429/162

(58) Field of Classification Search
CPC ... Y02T 90/14; Y02T 90/128; Y02T 10/6217; Y02T 10/7005; Y02T 10/705; Y02T 10/7088; B60L 11/123; B60L 11/1879; B60L 11/007; B60L 11/185; B60L 2200/12; Y02E 60/122
USPC .................. 429/181, 129, 131, 127, 153, 162
See application file for complete search history.

(56) References Cited

U.S. PATENT DOCUMENTS

| | | | | |
|---|---|---|---|---|
| 6,743,546 | B1 * | 6/2004 | Kaneda et al. | 429/127 |
| 6,849,358 | B2 * | 2/2005 | O'Connell | 429/211 |

(Continued)

FOREIGN PATENT DOCUMENTS

| | | |
|---|---|---|
| EP | 1 418 638 A2 | 5/2004 |
| EP | 1 455 400 A2 | 9/2004 |
| JP | 2000-215877 | 8/2000 |

*Primary Examiner* — Milton I Cano
*Assistant Examiner* — Stephen Yanchuk
(74) *Attorney, Agent, or Firm* — Oblon, Spivak, McClelland, Maier & Neustadt, L.L.P.

(57) ABSTRACT

A nonaqueous electrolyte battery includes a flattened electrode group, a case, a positive electrode terminal and a negative electrode terminal. The positive electrode terminal is bent around one edge portion of the positive electrode terminal, curved toward the electrode group and reaches a sealed portion. The other edge portion of the positive electrode terminal extends from the case through the sealed portion. The negative electrode terminal is bent around one edge portion of the negative electrode terminal, curved toward the electrode group and reaches the sealed portion. The other edge portion of the negative electrode terminal extends from the case through the sealed portion. The positive electrode terminal satisfies formula (1) given below and the negative electrode terminal satisfies formula (2) given below:

$$t_2 \times W_2 \geq 0.25\, S_p \qquad (1)$$

$$t_3 \times W_3 \geq 0.25\, S_n \qquad (2)$$

14 Claims, 14 Drawing Sheets

(56) References Cited

U.S. PATENT DOCUMENTS

| | | | |
|---|---|---|---|
| 6,908,711 B2* | 6/2005 | Fauteux et al. | 429/231.95 |
| 2003/0228515 A1* | 12/2003 | Woehrle et al. | 429/160 |
| 2005/0287429 A1* | 12/2005 | Cho et al. | 429/161 |
| 2006/0046148 A1* | 3/2006 | Sakai et al. | 429/245 |
| 2006/0073382 A1* | 4/2006 | Urano et al. | 429/161 |
| 2006/0093923 A1* | 5/2006 | Howard et al. | 429/322 |
| 2006/0286416 A1* | 12/2006 | Willets et al. | 429/17 |
| 2007/0166611 A1* | 7/2007 | Oh et al. | 429/160 |

\* cited by examiner

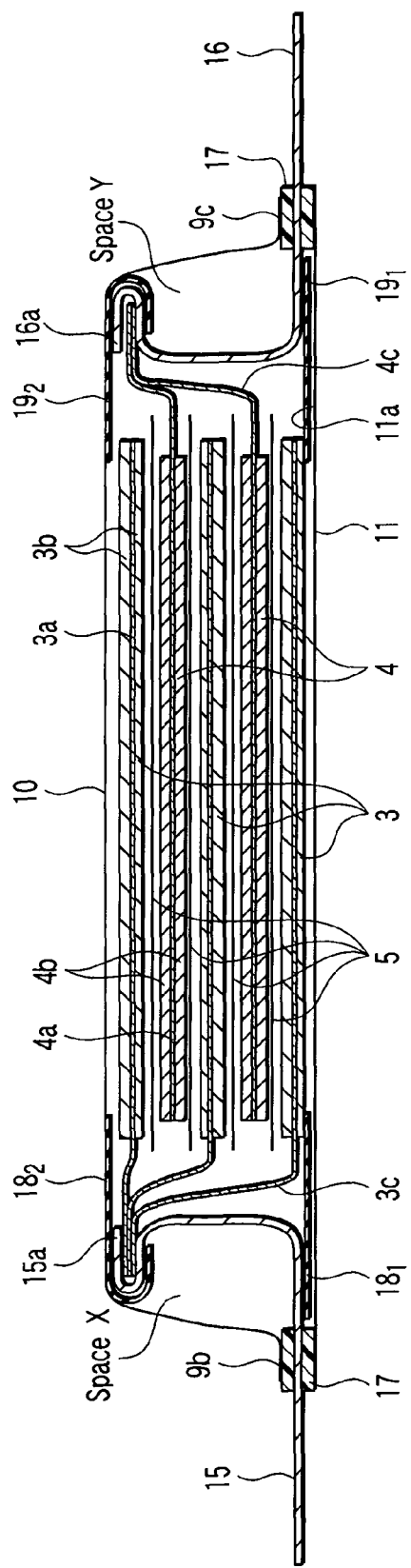
F I G. 2

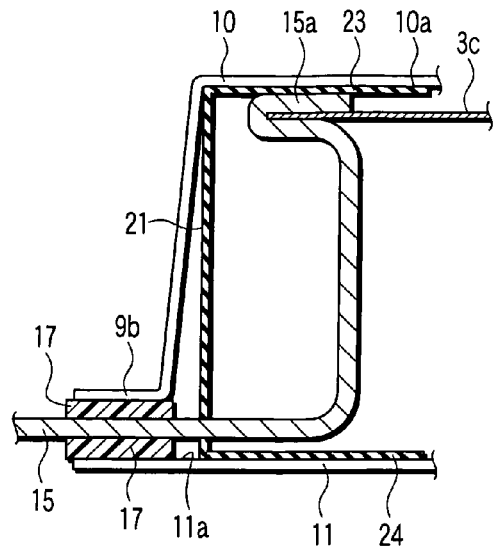
F I G. 11
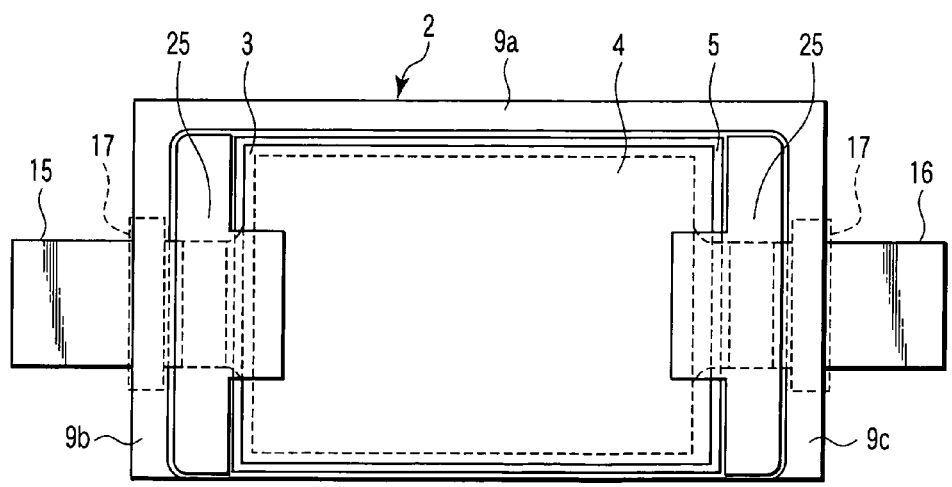
F I G. 12

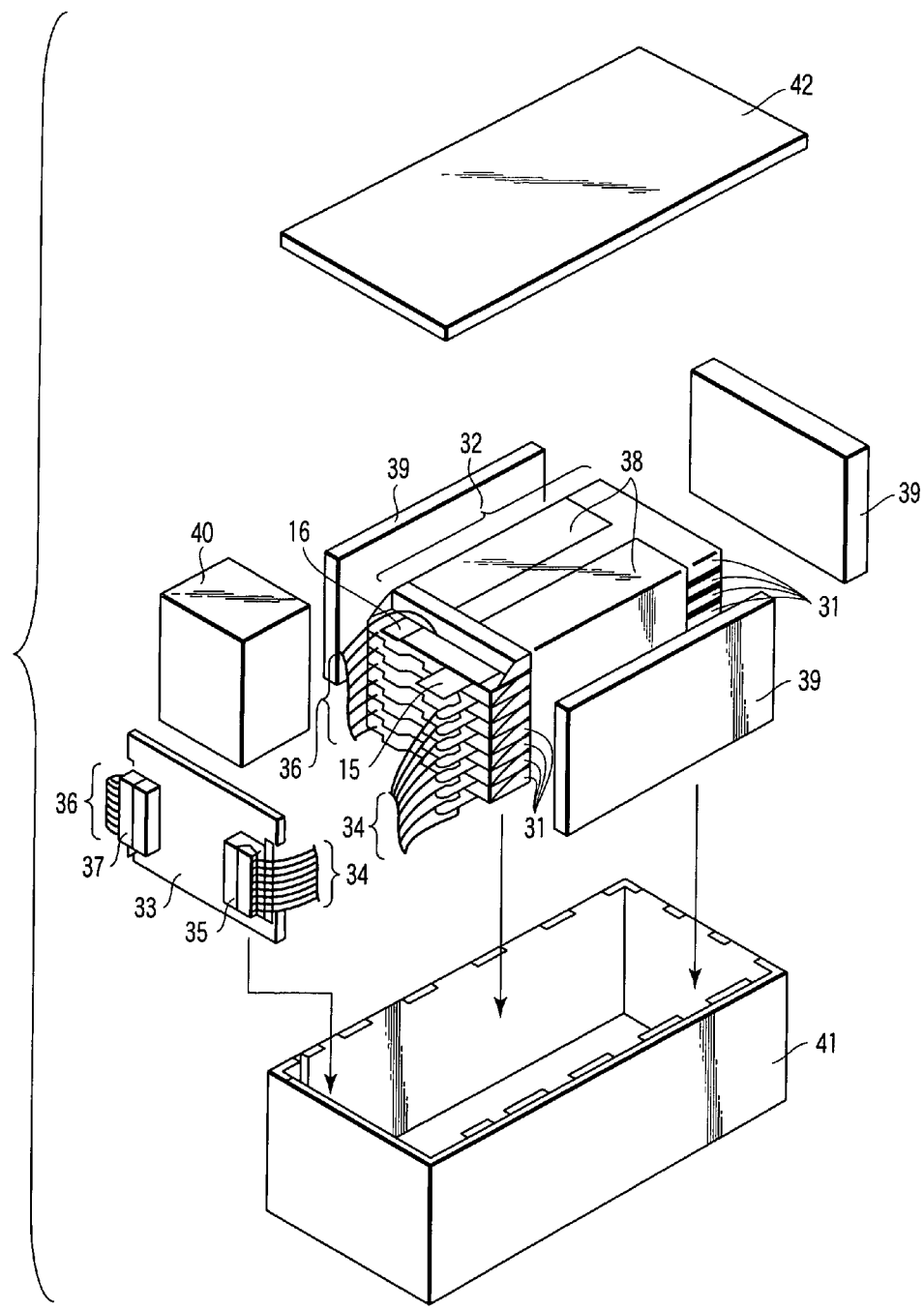
F I G. 17

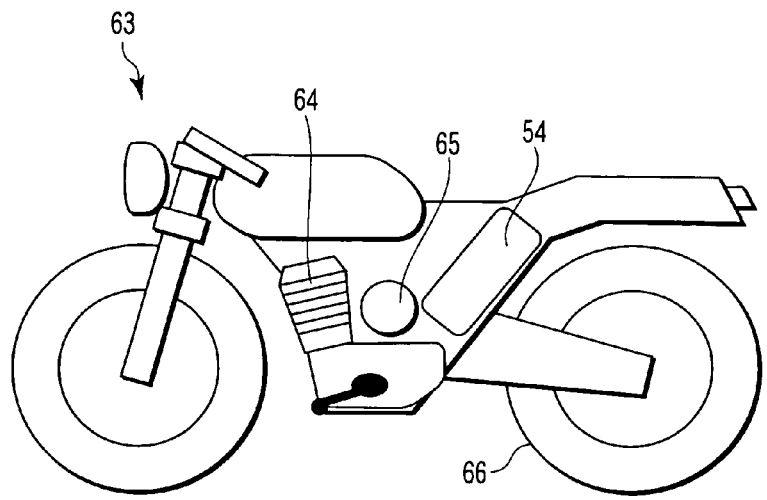
F I G. 23
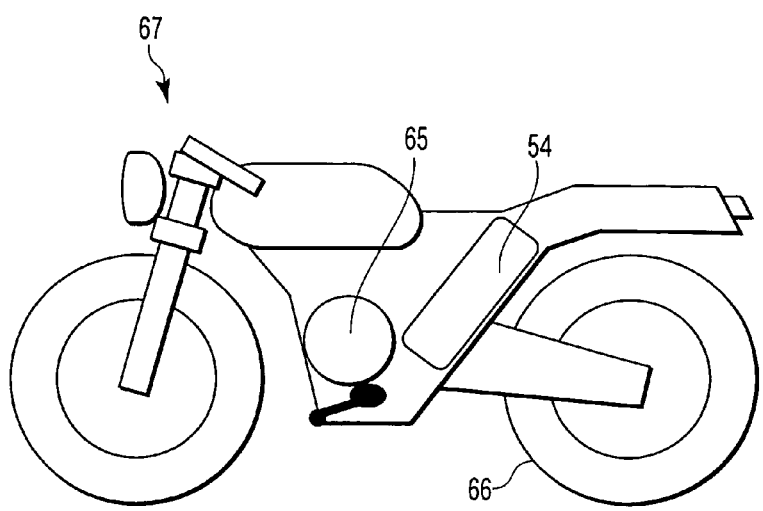
F I G. 24

ND AQUEOUS ELECTROLYTE BATTERY, BATTERY PACK AND VEHICLE

CROSS-REFERENCE TO RELATED APPLICATIONS

This application is based upon and claims the benefit of priority from prior Japanese Patent Application No. 2006-045381, filed Feb. 22, 2006, the entire contents of which are incorporated herein by reference.

BACKGROUND OF THE INVENTION

1. Field of the Invention

The present invention relates to a nonaqueous electrolyte battery, a battery pack using the nonaqueous electrolyte battery, and a vehicle having the battery pack mounted thereto.

2. Description of the Related Art

With a rapid propagation of a portable personal computer and a cordless equipment, a secondary battery of a high performance has come to be required as a power source of the portable personal computer and the cordless equipment. A nonaqueous electrolyte secondary battery in which substances capable of absorbing-releasing lithium ions are used for forming the positive electrode and negative electrode has already been developed as such a secondary battery and has already been put to a practical use as a power source of a small electronic equipment. Also, in recent years, the nonaqueous electrolyte battery is used not only in the portable electronic equipment but also in a wide field such as a cordless household electric appliance, a power assist bicycle and a hybrid vehicle.

When the battery is used in such a broadened field, the environment in which the battery is used also differs from that of the battery used in the conventional small electronic equipment. For example, it is conceivable for the vibration to be consecutively applied to the battery in the case where the battery is mounted to a vehicle. It is also conceivable for a large impact to be applied at random to the battery in the case where the battery is mounted to a power tool. The secondary battery is required to withstand such a vibration or an impact and not to get out of order or not to be put in an unsafe state.

On the other hand, the secondary battery is required to exhibit satisfactory battery characteristics. For example, the secondary battery is required to have a large capacity and a high output. In the secondary battery of a large capacity, the weight per battery is increased substantially in proportion to the capacity of the battery. Where the battery weight is increased under the state that the mechanical strength and the rigidity of the constituting factors of the battery are left unchanged, it is apparent that the resistance of the secondary battery to the vibration or impact is lowered. In view of the high output, the electrode terminal of the secondary battery for taking out the current from the battery is required to have a low resistance. In order to satisfy the particular requirement, it is desirable to increase the cross sectional area of the electrode terminal. The electrode terminal having a large cross sectional area is desirable in that the electrode terminal has a high mechanical strength and is unlikely to be bent. On the other hand, the electrode current collector to which the electrode terminal is connected is formed of the metal foil used as a base material of the electrode or formed of a thin metal piece connected to the electrode edge section. Therefore, the electrode current collector has a relatively small mechanical strength in many cases. The electrode current collector having a small mechanical strength tends to be broken with a high probability in the connecting portion between the electrode terminal having a relatively large mechanical strength and the electrode current collector having a relatively small mechanical strength, if displacement is generated in the connecting portion by the external force such as vibration or impact.

In general, in the battery including a flattened electrode group, the restricting force for restricting the displacement of the electrode group is insufficient in a direction parallel to the main surface of the electrode included in the electrode group and, thus, the electrode group tends to be moved inside the case when the battery receives a strong vibration or impact. Particularly, where the case of the battery is formed of a laminate film, it is substantially impossible to suppress the movement of the electrode group within the case. If a space for connecting the electrode current collector to the electrode terminal is formed inside the case formed of the laminate film, the electrode group tends to be moved more easily.

A serious problem that is generated by the movement of the electrode group within the case is an inner short circuit of the battery. Where the electrode group is moved toward the electrode terminal, one edge of the electrode terminal inside the case is stuck against the power generating element (electrode group) so as to bring about an inner short circuit of the battery because the electrode terminal generally has a mechanical strength higher than that of another element, e.g., a separator, included in the electrode group.

Jpn. Pat. Appln. KOKAI No. 2000-215877 given below relates to a flattened battery and is directed to the technique of preventing the electrode lead terminal from being broken when the battery receives vibration or impact. Each of the positive electrode and the negative electrode included in the flattened battery comprises a lead terminal having one edge welded to the terminal section of the electrode and having the other edge portion drawn to the outside of the case. The electrode lead terminal was folded in a manner to cover the terminal section, followed by welding the folded section of the lead terminal to the terminal section. Further, the lead terminal was bent toward the case, with the result that the electrode terminal positioned within the case was shaped substantially like a letter S. In other words, that portion of the lead terminal which extends from the connecting portion at which the lead terminal is connected to the terminal section to reach the case is folded in substantially an S-shape. The moving stress applied to the battery by the impact when the battery is dropped is absorbed or moderated by the elongation or shrinkage of the S-shaped folded portion of the lead terminal so as to prevent the lead terminal from being broken.

However, if the S-shaped folded portion is formed in the lead terminal for moderating the stress, the degree of freedom of the displacement of the lead terminal is increased. Particularly, where the resonance frequency of the lead terminal conforms with the frequency of the external vibration, the amplitude of the displacement of the lead terminal is increased so as to give rise to the metal fatigue in the connecting section between the lead terminal and the current collector or in the lead terminal or the current collector in the vicinity of the connecting section noted above, leading to a breakage problem.

Further, if a substantially S-shaped folded portion is formed in the lead terminal as disclosed in Jpn. Pat. Appln. KOKAI No. 2000-215877 noted above, the movement of the electrode group is promoted, leading to the problem that it is impossible to obtain the effect of suppressing the internal short circuit.

BRIEF SUMMARY OF THE INVENTION

According to an embodiment of the present invention, there is provided a nonaqueous electrolyte battery, comprising:

a flattened electrode group including a positive electrode and a negative electrode, the positive electrode including a positive electrode current collector, and the negative electrode including a negative electrode current collector;

a case having the electrode group housed therein and including a sealed portion in at least a part of a periphery;

a positive electrode terminal having one edge portion electrically connected to the positive electrode current collector and the other edge portion, the positive electrode terminal being bent around the one edge portion of the positive electrode terminal, curved toward the electrode group and reaching the sealed portion, and the other edge portion of the positive electrode terminal extending from the case through the sealed portion; and a negative electrode terminal having one edge portion electrically connected to the negative electrode current collector and the other edge portion, the negative electrode terminal being bent around the one edge portion of the negative electrode terminal, curved toward the electrode group and reaching the sealed portion, and the other edge portion of the negative electrode terminal extending from the case through the sealed portion;

wherein the positive electrode terminal satisfies formula (1) given below and the negative electrode terminal satisfies formula (2) given below:

$$t_2 \times W_2 \geq 0.25\, S_p \quad (1)$$

$$t_3 \times W_3 \geq 0.25\, S_n \quad (2)$$

where $S_p$ denotes a cross-sectional area of the electrode group that is obtained when the electrode group is cut along a plane perpendicular to an extending direction of the positive electrode terminal, $t_2$ denotes a height of the positive electrode terminal in a direction perpendicular to an electrode reaction surface of the electrode group, $W_2$ denotes a width of the positive electrode terminal, $S_n$ denotes a cross-sectional area of the electrode group that is obtained when the electrode group is cut along a plane perpendicular to an extending direction of the negative electrode terminal, $t_3$ denotes a height of the negative electrode terminal in a direction perpendicular to the electrode reaction surface of the electrode group, and $W_3$ denotes a width of the negative electrode terminal.

According to another embodiment of the present invention, there is provided a battery pack comprising nonaqueous electrolyte batteries which comprise:

a flattened electrode group including a positive electrode and a negative electrode, the positive electrode including a positive electrode current collector, and the negative electrode including a negative electrode current collector;

a case having the electrode group housed therein and including a sealed portion in at least a part of a periphery;

a positive electrode terminal having one edge portion electrically connected to the positive electrode current collector and the other edge portion, the positive electrode terminal being bent around the one edge portion of the positive electrode terminal, curved toward the electrode group and reaching the sealed portion, and the other edge portion of the positive electrode terminal extending from the case through the sealed portion; and a negative electrode terminal having one edge portion electrically connected to the negative electrode current collector and the other edge portion, the negative electrode terminal being bent around the one edge portion of the negative electrode terminal, curved toward the electrode group and reaching the sealed portion, and the other edge portion of the negative electrode terminal extending from the case through the sealed portion;

wherein the positive electrode terminal satisfies formula (1) given below and the negative electrode terminal satisfies formula (2) given below:

$$t_2 \times W_2 \geq 0.25\, S_p \quad (1)$$

$$t_3 \times W_3 \geq 0.25\, S_n \quad (2)$$

where $S_p$ denotes a cross-sectional area of the electrode group that is obtained when the electrode. group is cut along a plane perpendicular to an extending direction of the positive electrode terminal, $t_2$ denotes a height of the positive electrode terminal in a direction perpendicular to an electrode reaction surface of the electrode group, $W_2$ denotes a width of the positive electrode terminal, $S_n$ denotes a cross-sectional area of the electrode group that is obtained when the electrode group is cut along a plane perpendicular to an extending direction of the negative electrode terminal, $t_3$ denotes a height of the negative electrode terminal in a direction perpendicular to the electrode reaction surface of the electrode group, and $W_3$ denotes a width of the negative electrode terminal.

According to another embodiment of the present invention, there is provided a vehicle comprising a nonaqueous electrolyte battery comprises:

a flattened electrode group including a positive electrode and a negative electrode, the positive electrode including a positive electrode current collector, and the negative electrode including a negative electrode current collector;

a case having the electrode group housed therein and including a sealed portion in at least a part of a periphery;

a positive electrode terminal having one edge portion electrically connected to the positive electrode current collector and the other edge portion, the positive electrode terminal being bent around the one edge portion of the positive electrode terminal, curved toward the electrode group and reaching the sealed portion, and the other edge portion of the positive electrode terminal extending from the case through the sealed portion; and a negative electrode terminal having one edge portion electrically connected to the negative electrode current collector and the other edge portion, the negative electrode terminal being bent around the one edge portion of the negative electrode terminal, curved toward the electrode group and reaching the sealed portion, and the other edge portion of the negative electrode terminal extending from the case through the sealed portion;

wherein the positive electrode terminal satisfies formula (1) given below and the negative electrode terminal satisfies formula (2) given below:

$$t_2 \times W_2 \geq 0.25\, S_p \quad (1)$$

$$t_3 \times W_3 \geq 0.25\, S_n \quad (2)$$

where $S_p$ denotes a cross-sectional area of the electrode group that is obtained when the electrode group is cut along a plane perpendicular to an extending direction of the positive electrode terminal, $t_2$ denotes a height of the positive electrode terminal in a direction perpendicular to an electrode reaction surface of the electrode group, $W_2$ denotes a width of the positive electrode terminal, $S_n$ denotes a cross-sectional area of the electrode group that is obtained when the electrode group is cut along a plane perpendicular to an extending direction of the negative electrode terminal, $t_3$ denotes a height of the negative electrode terminal in a direction perpendicular to the electrode reaction surface of the electrode group, and $W_3$ denotes a width of the negative electrode terminal.

BRIEF DESCRIPTION OF THE SEVERAL VIEWS OF THE DRAWING

FIG. 2 is a vertical cross sectional view showing the construction of the nonaqueous electrolyte battery shown in FIG. 1;

FIG. 11 is a cross sectional view showing in a magnified fashion the main portion of the nonaqueous electrolyte battery shown in FIG. 10;

FIG. 12 is a planar perspective view showing the construction of another nonaqueous electrolyte battery according to the second embodiment of the present invention;

FIG. 17 is an oblique view showing in a dismantled fashion the construction of a battery pack according to a fourth embodiment of the present invention;

FIG. 23 schematically shows the construction of a hybrid motor bicycle according to the fifth embodiment of the present invention;

FIG. 24 schematically shows the construction of an electric motor bicycle according to the fifth embodiment of the present invention;

DETAILED DESCRIPTION OF THE INVENTION

The nonaqueous electrolyte battery, the battery pack and the vehicle according to the embodiments of the present invention permit suppressing the internal short circuit upon receipt of an impact such as dropping. Each of the embodiments of the present invention will now be described in detail.

(First Embodiment)

Figure 1:
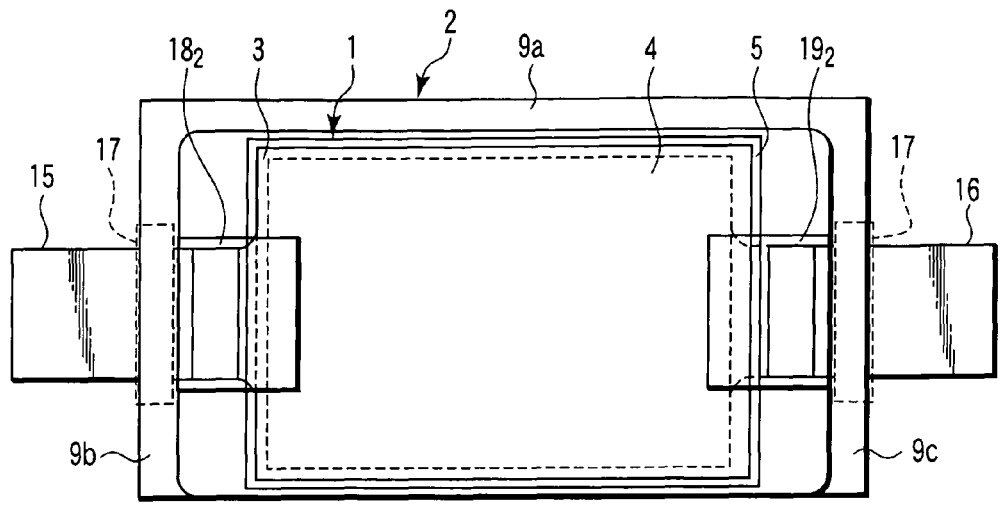
FIG. 1 is a planar perspective view showing the construction of a flattened nonaqueous electrolyte battery according to a first embodiment of the present invention.
Figure 3:
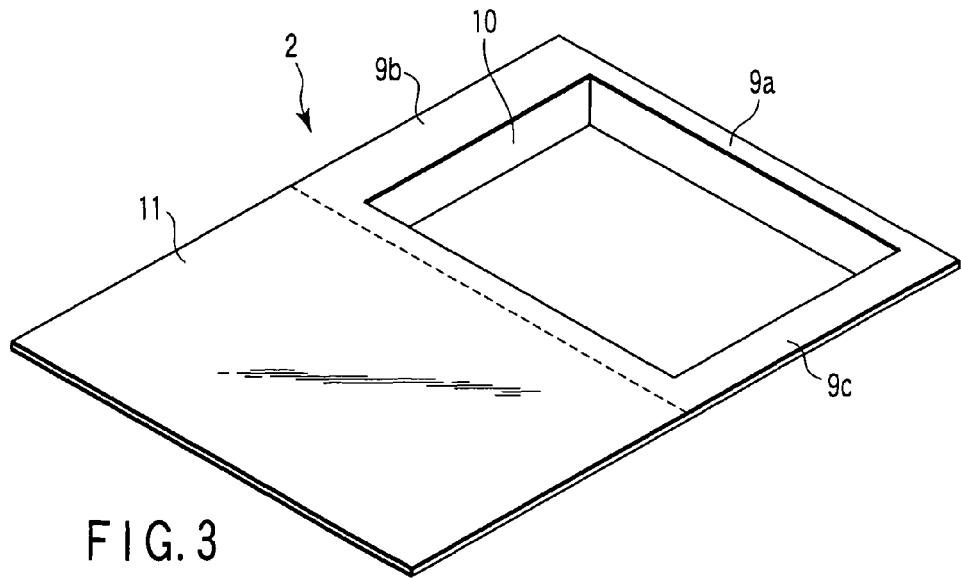
FIG. 3 is an oblique view schematically showing the case included in the nonaqueous electrolyte battery shown in FIG. 1.
Figure 4:
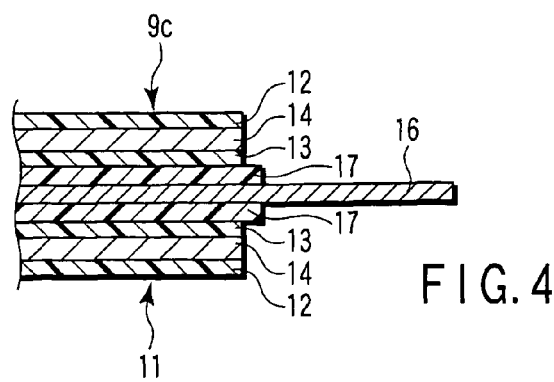
FIG. 4 is a cross sectional view showing in a magnified fashion the construction of the sealing portion of the nonaqueous electrolyte battery shown in FIG. 1.
Figure 5:
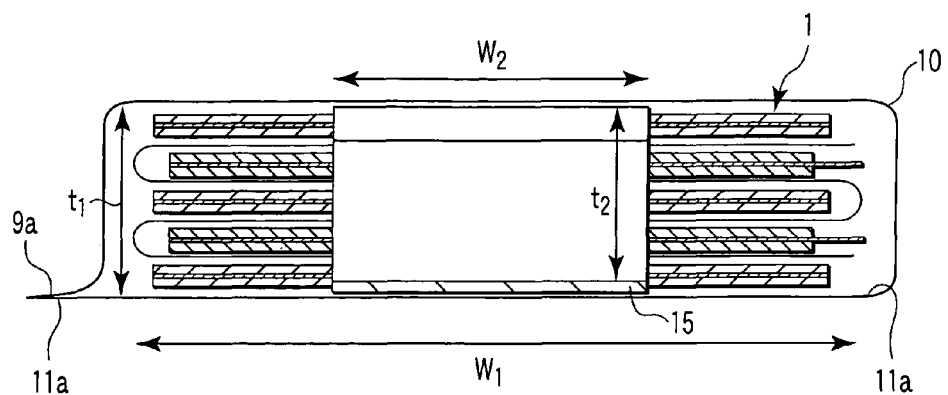
FIG. 5 is a perspective view showing the construction of the nonaqueous electrolyte battery shown in FIG. 1 as viewed in the extending direction of the positive electrode terminal.
Figure 6:
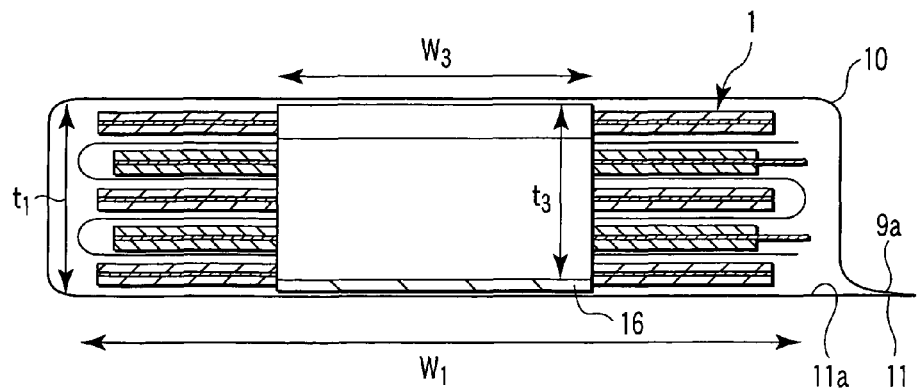
FIG. 6 is a perspective view showing the construction of the nonaqueous electrolyte battery shown in FIG. 1 as viewed in the extending direction of the negative electrode terminal.
Figure 7:
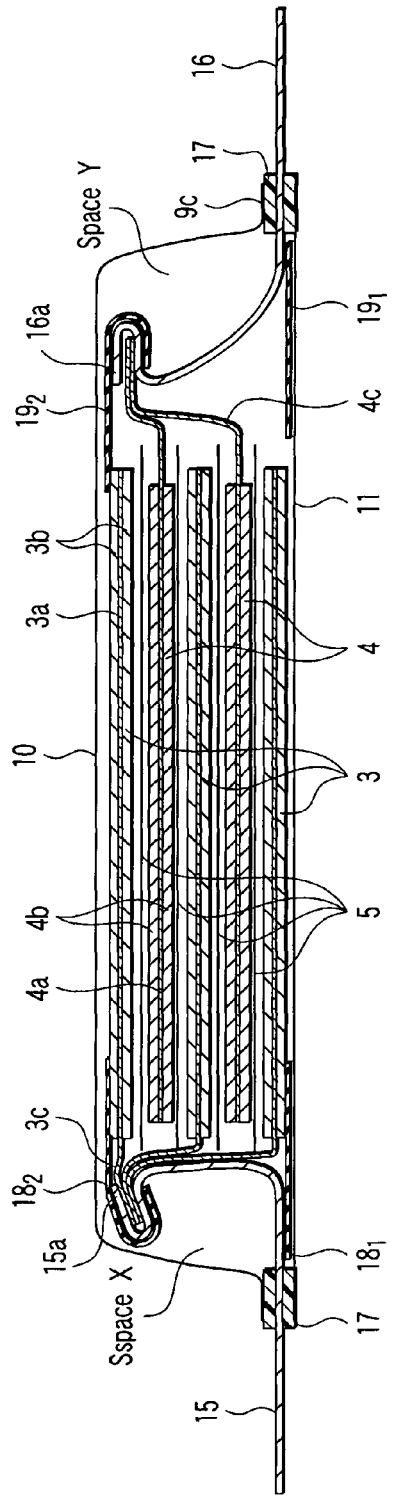
FIG. 7 is a vertical cross sectional view showing the state that an impact such as dropping is applied to the nonaqueous electrolyte battery shown in FIG. 1.

FIGS. 1 to 6 collectively show the nonaqueous electrolyte battery according to a first embodiment of the present invention, wherein FIG. 1 is a planar perspective view showing the construction of a flattened nonaqueous electrolyte battery according to the first embodiment of the present invention, FIG. 2 is a vertical cross sectional view of the nonaqueous electrolyte battery shown in FIG. 1, FIG. 3 is an oblique view schematically showing the case included in the nonaqueous electrolyte battery shown in FIG. 1, FIG. 4 is a cross sectional view showing in a magnified fashion the construction of the sealing portion of the nonaqueous electrolyte battery shown in FIG. 1, FIG. 5 is a perspective view showing the construction of the nonaqueous electrolyte battery shown in FIG. 1 as viewed in the extending direction of the positive electrode terminal, and FIG. 6 is a perspective view showing the construction of the nonaqueous electrolyte battery shown in FIG. 1 as viewed in the extending direction of the negative electrode terminal. Further, FIG. 7 is a vertical cross sectional view showing the state that an impact such as dropping is applied to the nonaqueous electrolyte battery shown in FIG. 1.

As shown in the FIGS. 1 and 2, a flattened electrode group (power generating element) 1 is housed in a case 2. A nonaqueous electrolyte (not shown) is held by the electrode group 1. The electrode group 1 has a laminate structure prepared by alternately laminating a plurality of strip-shaped positive electrodes 3 and a plurality of strip-shaped negative electrodes 4 one upon the other with a separator 5 interposed between the positive electrode 3 and the negative electrode 4 that are positioned adjacent to each other. The four sides in the peripheral portion of the positive electrode 3 protrude from the four sides in the peripheral portion of the negative electrode 4. In other words, the positive electrode 3 is larger than the negative electrode 4. Each of the positive electrodes 3 comprise a positive electrode current collector $3a$ and positive electrode active material layers $3b$ laminated on both surfaces of the positive electrode current collector $3a$. On the other hand, each of the negative electrodes 4 comprises a negative electrode current collector 4a and negative electrode active material layers 4b laminated on both surfaces of the negative electrode current collector 4a.

As shown in FIG. 3, a case 2 comprises a container 10 formed of a rectangular concave section, which is prepared by applying, for example, a deep drawing or a pressing to a laminate film, and a rectangular lid 11 formed of the flat portion of the laminate film that is not processed. If the flat portion of the laminate film is folded toward the container 10 along the dotted line, the lid 11 is allowed to cover the container 10. FIGS. 1 and 2 collectively show the state that the open section of the container 10 is closed by the lid 11. The lid 11 is bonded to as the joining sections a longer side edge portion 9a and the shorter side edge portions 9b, 9c formed in the periphery of the open section of the container 10. FIG. 3 shows that the lid 11 is formed integral with the container 10 in advance, and the edge portions are formed in the three sides of the periphery of the open section of the container 10. However, the case 2 is not limited to the particular construction. For example, it is possible to use the container 10 formed separately from the lid 11 and having the edge portions formed in all of the peripheral regions of the open section.

An electrode group 1 is housed in the container 10 such that the electrode reaction surface of the electrode group 1 is held parallel to the lid 11. The electrode reaction surface noted above denotes the surface on which a positive electrode active material layer 3b carries out a reaction with a negative electrode active material layer 4b or the negative electrode active material layer 4b carries out a reaction with the positive electrode active material layer 3b. The lid 11 is defined to be parallel to the electrode reaction surface in the case where the lid 11 is parallel to any of the electrode reaction surfaces noted above. By contraries, the lid 11 is defined to be perpendicular to the electrode reaction surface in the case where the lid 11 is perpendicular to any of the electrode reaction surfaces noted above.

As shown in FIG. 4, the laminate film comprises a resin layer 12, a thermoplastic resin layer 13, and a metal layer 14 interposed between the resin layer 12 and the thermoplastic resin layer 13. The thermoplastic resin layer 13 is positioned on the inner surface of each of the container 10 and the lid 11.

The longer side edge portion 9a is thermally fused to the lid 11 by using the thermoplastic resin layer 13 positioned inside these longer side edge portion 9a and the lid 11. Also, the shorter side edge portion 9b and the lid 11 are thermally fused to each other with a band-like positive electrode terminal 15 sandwiched therebetween so as to form a first sealed portion. The tip portion of a positive electrode terminal 15 is drawn to the outside of the case via the first sealed portion between the shorter side edge portion 9b and the lid 11. On the other hand, the shorter side edge portion 9c is thermally fused to the lid 11 with a band-like negative electrode terminal 16 sandwiched therebetween so as to form a second sealed portion, as shown in FIG. 4. The tip portion of the negative electrode terminal 16 is drawn to the outside of the case via the second sealed portion between the shorter side edge portion 9c and the lid 11. The negative electrode terminal 16 and the positive electrode terminal 15 are drawn on the same axis in opposite directions. In other words, the current flowing directions of the negative electrode terminal 16 and the positive electrode terminal 15 are on the same axis and opposite to each other.

A first insulating film 17 covers those portions of the both surfaces of the positive electrode terminal 15 which are positioned to face the shorter side edge portion 9b and the lid 11 and also covers those portions of the both surfaces of the negative electrode terminal 16 which are positioned to face the shorter side edge portion 9c and the lid 11. The first insulating film 17 serves to prevent the short circuit between the electrode terminals, i.e., the positive electrode terminal 15 and the negative electrode terminal 16, and the metal layer 14 within the case 2. The first insulating film 17 also serves to improve the sealing properties of the case 2.

The edge portion 15a on the opposite side of the positive electrode terminal 15, i.e., the edge portion 15a of the positive electrode terminal 15 that is positioned inside the case 2, is connected to a plurality of positive electrode current collector lead sections 3c. As a result, the positive electrode terminal 15 is electrically connected to the positive electrode current collector 3a. Each of the positive electrode current collector lead sections 3c is formed of a part of the edge section of the positive electrode current collector 3a included in the positive electrode 3 and protruding in the direction of the longer side of the electrode group 1. The positive electrode current collector lead sections 3c are bundled and connected in a bundled state to the edge portion 15a of the positive electrode terminal 15. The positive electrode terminal 15 is bent around the edge portion 15a of the positive electrode terminal toward the electrode group 1. The positive electrode current collector lead section 3c is held between the bent section of the positive electrode terminal 15. Further, the positive electrode terminal 15 is curved toward the electrode group 1 within a space X formed between the electrode group 1 and the case 2. The other edge portion of the positive electrode terminal 15 is drawn from the case 2 through the clearance between the shorter side edge portion 9b and the lid 11.

The positive electrode terminal 15 is positioned to face the edge surface of the electrode group 1. The area of the positive electrode terminal 15 facing the edge surface of the electrode group 1 is determined by a width $W_2$ and a height $t_2$, as shown in FIG. 5.

As described herein later, second insulating films $18_1$ and $18_2$ used as the insulating member serve to insulate the positive electrode terminal 15 and the positive electrode current collector lead section 3c from the metal layer 14 included in the laminate film used for forming the case 2. The second insulating film $18_1$ is attached to the inner surface 11a of the lid 11 and is positioned to face the positive electrode terminal 15 and the positive electrode current collector lead section 3c. Also, the other second insulating film $18_2$ covers the connecting section between the edge portion 15a and the positive electrode current collector lead section 3c.

The edge portion 16a on the opposite side of the negative electrode terminal 16, i.e., the edge portion 16a positioned within the case, is connected to a plurality of negative electrode current collector lead sections 4c so as to connect electrically the negative electrode terminal 16 to the negative electrode current collector 4a. The negative electrode current collector lead section 4c is formed of a part of the edge section of the negative electrode current collector 4a of the negative electrode 4 that protrudes in the direction of the longer side of the electrode group 1. Incidentally, the negative electrode current collector lead section 4c and the positive electrode current collector lead section 3c extend in opposite directions. The negative electrode current collector lead sections 4c are bundled and connected to the negative electrode terminal 16 under a bundled state. The negative electrode terminal 15 is bent around the edge portion 16a of the negative electrode terminal 16 toward the electrode group 1. The negative electrode current collector lead section 4c is held between the bent section of the negative electrode terminal 16. Further, the negative electrode terminal 16 is curved toward the electrode group 1 within a space Y formed between the electrode group 1 and the case 2. The other edge portion of the negative electrode terminal 16 is drawn from the case 2 through the clearance between the shorter side edge portion 9c and the lid 11.

The negative electrode terminal 16 is positioned to face the edge surface of the electrode group 1. The area of the negative electrode terminal 16 facing the edge surface of the electrode group 1 is determined by a width $W_3$ and a height $t_3$, as shown in FIG. 6.

As described herein later, third insulating films $19_1$ and $19_2$ used as the insulating member are intended to insulate the negative electrode terminal 16 and the negative electrode current collector lead section 4c from the metal layer 14 included in the laminate film used for forming the case 2. To be more specific, the third insulating film $19_1$ is attached to the inner surface 11a of the lid 11 and is positioned to face the negative electrode terminal 16 and the negative electrode current collector lead section 4c. On the other hand, the other third insulating film $19_2$ covers the connecting section between the edge portion 16a and the negative electrode current collector lead section 4c.

The second insulating films $18_1$, $18_2$ and the third insulating films $19_1$, $19_2$ will now be described in detail. As described previously, in order to draw the positive electrode terminal 15 and the negative electrode terminal 16 to the outside from within the hermetically closed case, a sealing by the thermal fusion is carried out under the state that the positive electrode terminal 15 and negative electrode terminal 16 are sandwiched between the container 10 and the lid 11. As a result, the heat generated by the thermal fusion in the sealing stage is transmitted to the electrode terminals so as to heat the entire electrode terminals to a high temperature. It follows that, if the portion of the electrode terminal other than the sealed portion is in contact with the inner surface of the case, the resin layer on the inner surface of the case is melted so as to expose the metal layer included in the case to the outside. As a result, the electrode terminal is brought into contact with the metal layer included in the case so as to bring about a short circuit problem. In order to prevent the particular short circuit problem, the positive electrode terminal 15 and the negative electrode terminal 16 are covered by an insulating member so as to prevent the positive electrode terminal 15 and the negative electrode terminal 16 from being brought into contact with the inner surface of the case. It is desirable for the portions where the electrode terminal is positioned close to or in contact with the inner surface of the case to be covered with the insulating member as shown in FIG. 2. It is possible to use as the insulating member an insulating tape formed of, for example, polypropylene, polyethylene, polyethylene terephthalate, polyphenylene sulfide, polyimide, or polytetrafluoro ethylene (PTFE). Also, it is desirable for the insulating tape to be formed of a material having a melting point higher than that of the inner surface of the case.

The positive electrode terminal 15 satisfies formula (1) given below and the negative electrode terminal 16 satisfies formula (2) given below:

$$t_2 \times W_2 \geq 0.25\, S_p \qquad (1)$$

$$t_3 \times W_3 \geq 0.25\, S_n \qquad (2)$$

Formula (1) will now be described with reference to FIG. 5. $S_p$ denotes the cross sectional area of the electrode group 1 that is obtained when the electrode group is cut along a plane perpendicular to the extending direction of the positive electrode terminal 15. The cross sectional area $S_p$ is calculated by the formula of, for example, $t_1 \times W_1$, where $t_1$ denotes the thickness of the electrode group 1, and $W_1$ denotes the width of the electrode group 1 defined by a length of the electrode group 1 in the direction perpendicular to the extending direction of the positive electrode terminal 15. $t_2$ denotes a height of the positive electrode terminal 15 in a direction perpendicular to the electrode reaction surface of the electrode group 1. $W_2$ denotes the shorter width of the positive electrode terminal 15. Incidentally, the thickness $t_1$ and the width $W_1$ of the electrode group 1 denote the values obtained by applying a load of 1 (N) to a disk-like measuring element having a diameter of 10 mm.

On the other hand, $S_n$ denotes the cross sectional area of the electrode group 1 that is obtained when the electrode group 1 is cut along a plane perpendicular to the extending direction of the negative electrode terminal 16 as shown in FIG. 6. In the case of FIG. 6, the value of the cross sectional area $S_n$ is equal to that of the cross sectional area $S_p$. $t_3$ denotes a height of the negative electrode terminal 16 in the direction perpendicular to the electrode reaction surface of the electrode group 1. Further, $W_3$ denotes the shorter width of the negative electrode terminal 16.

Where the electrode group 1 is moved toward the positive electrode terminal 15 by an impact such as dropping, the edge surface of the electrode group 1 strikes against the positive electrode terminal 15, with the result that the weight of the electrode group 1 is supported by the area $(t_2 \times W_2)$ of the positive electrode terminal 15, as shown in FIG. 7. The edge surface of the electrode group 1, at which the laminated surfaces of the positive electrode, the negative electrode and the separator are exposed to the outside, has a small mechanical strength, with the result that, if a projected portion, e.g., the positive electrode terminal 15, strikes against the edge surface of the electrode group, it is possible for a short circuit to be brought about easily. The positive electrode terminal 15 is bent around the one edge portion 15a of the positive electrode terminal toward the electrode group 1, and curved toward the electrode group 1 within the space X provided between the electrode group 1 and the case 2. The other edge portion of the positive electrode terminal 15 extends from the case 2 through the clearance between the shorter side edge portion 9b and the lid 11. Therefore, the positive electrode terminal 15 does not include a sharp portion protruding toward the electrode group 1 unlike positive electrode terminal included in the flattened battery disclosed in Jpn. Pat. Appln. KOKAI No. 2000-215877 quoted previously. At the same time, the load is supported by the area $(t_2 \times W_2)$ of the positive electrode terminal 15, i.e., supported by a large area not smaller than $0.25 S_p$, with the result that the positive electrode terminal 15 is not stuck easily against the edge surface of the electrode group 1 so as to make it possible to prevent the short circuit generation. Incidentally, in the case of FIG. 7, the electrode group 1 is moved toward the positive electrode terminal 15, i.e., moved away from the negative electrode terminal 16. The negative electrode terminal 16 has a sufficient allowance in the length thereof, with the result that the connecting portion is not broken even if an elongating stress or a folding stress is exerted on the negative electrode terminal 16.

Where the electrode group 1 is moved toward the negative electrode terminal 16, which is opposite to the moving direction of the electrode group 1 shown in FIG. 7, the edge surface of the electrode group 1 strikes against the negative electrode terminal 16, with the result that the load is supported by the area $(t_3 \times W_3)$ of the negative electrode terminal 16. The negative electrode terminal 16 is bent around the one edge portion 16a of the negative electrode terminal toward the electrode group 1, and curved toward the electrode group 1 within the space Y provided between the electrode group 1 and the case 2. The other edge portion of the negative electrode terminal 16 extends from the case 2 through the clearance between the shorter side edge portion 9c and the lid 11. It follows that the negative electrode terminal 16 does not include a sharp portion protruding toward the electrode group 1 unlike the negative electrode terminal included in the nonaqueous electrolyte battery disclosed in Jpn. Pat. Appln. KOKAI No. 2000-215877 quoted previously. At the same time, the load is supported by the portion of the negative electrode terminal 16 having an area of ($t_3 \times W_3$), i.e., supported by a large area not smaller than $0.25 S_n$. It follows that the negative electrode terminal does not strike easily the edge surface of the electrode group 1 so as to make it possible to suppress the short circuit generation.

Also, the positive electrode terminal 15 has a sufficient allowance in the length and, thus, even if the electrode group 1 is moved away from the positive electrode terminal 15, the connecting portion between the positive electrode terminal 15 and the positive electrode current collector lead section 3c is not broken. It follows that, according to the first embodiment of the present invention, an excessively large stress is not concentrated on the positive electrode current collector 3a, the negative electrode current collector 4a, the positive electrode terminal 15, the negative electrode terminal 16 and each of the connecting sections thereof so as to prevent the breakage thereof.

The upper limit of the area ($t_2 \times W_2$) of the rising portion of the positive electrode terminal 15 can be set at $1.0 S_p$. Also, the upper limit of the area ($t_3 \times W_3$) of the rising portion of the negative electrode terminal 16 can be set at $1.0 S_n$. By setting the upper limit at the value given above, it is possible to lower the breakage and the internal short circuit upon receipt of vibration or impact without impairing the required sealing properties so as to improve the reliability and safety of the nonaqueous electrolyte battery against vibration and impact. It is more desirable for the positive electrode terminal 15 and the negative electrode terminal 16 to satisfy formulas (1)' and (2)' given below:

$$0.3 S_p \le t_2 \times W_2 \le 0.8 S_p \tag{1}'$$

$$0.3 S_n \le t_3 \times W_3 \le 0.8 S_n \tag{2}'$$

In order to increase sufficiently the areas ($t_2 \times W_2$) and ($t_3 \times W_3$) of the rising portions of the positive electrode terminal 15 and the negative electrode terminal 16, it is desirable to increase the sizes $t_2$ and $t_3$. To be more specific, it is desirable for $t_2$ and $t_3$ to satisfy formulas (3) and (4) given below:

$$0.9 t_1 \le t_2 \le t_1 \tag{3}$$

$$0.9 t_1 \le t_3 \le t_1 \tag{4}$$

Where the vibration applied to the battery has a large component in the vertical direction on the main surface of the electrode group, the positive electrode terminal 15 and the negative electrode terminal 16 tend to be easily displaced by the bending load in the vertical direction. Since the amplitude is enlarged in the event of the resonance, it is possible for the positive electrode terminal 15 and the negative electrode terminal 16 to be broken by the metal fatigue. However, where $t_2$ and $t_3$ satisfy formulas (3) and (4) given above, respectively, the positive electrode terminal 15 and the negative electrode terminal 16 are less affected by the vibration applied to the surface of the electrode group 1 in the vertical direction so as to prevent the positive electrode terminal 15 and the negative electrode terminal 16 from being broken.

It is desirable for the width $W_2$ of the positive electrode terminal 15 to satisfy formula (5) given below and for the width $W_3$ of the negative electrode terminal 16 to satisfy formula (6) given below:

$$0.25 W_1 \le W_2 \le W_1 \tag{5}$$

$$0.25 W_1 \le W_3 \le W_1 \tag{6}$$

Incidentally, $W_1$ denotes the width of the electrode group 1 defined by a length of the electrode group 1 in a direction perpendicular to the extending direction of the positive electrode terminal 15 or the negative electrode terminal 16.

Where formulas (5) and (6) are satisfied, it is possible to provide a nonaqueous electrolyte battery excellent in reliability and safety relative to the impact and the vibration without impairing the sealing properties of the battery. It is more desirable for the width $W_2$ of the positive electrode terminal 15 and the width $W_3$ of the negative electrode terminal 16 to satisfy the conditions of $0.35 W_1 \le W_2 \le 0.9 W_1$ and $0.35 W_1 \le W_3 \le 0.9 W_1$, respectively.

The connecting section between the positive electrode current collector lead section 3c and the positive electrode terminal 15 and the connecting section between the negative electrode current collector lead section 4c and the negative electrode terminal 16 can be formed by various methods including, for example, a caulking, contact bonding, ultrasonic welding, laser welding and resistance welding. It is possible to use any of these methods as far as the connecting portion can be formed to exhibit a low electric resistance and a high mechanical strength by optimizing the connecting conditions. Where aluminum or an aluminum alloy is used for forming the positive electrode terminal 15 or the negative electrode terminal 16, it is desirable to employ the ultrasonic welding method because the connecting portion having a low electric resistance can be formed easily and with a high productivity.

Also, it is possible to superpose simply the positive electrode current collector lead section 3c and the negative electrode current collector lead section 4c on the positive electrode terminal 15 and the negative electrode terminal 16, respectively, followed by bonding the overlapping portion by the method described above so as to form the connecting section. Alternatively, it is desirable to fold the tip portions of the positive electrode terminal 15 and the negative electrode terminal 16 so as to form folded sections 15a and 16a, respectively, and to insert the positive electrode current collector lead section 3c and the negative electrode current collector lead section 4c into the folded sections 15a and 16a, as shown in FIG. 2. In this case, the bonding is performed from both surfaces of the folded tip sections 15a, 16a of the positive electrode terminal 15 and the negative electrode terminal 16. This method permits further increasing the mechanical strength of the connecting section between the electrode terminal and the electrode current collector lead section so as to increase the reliability of the connecting section. It should also be noted in this connection that it is desirable to employ the bonding method under the state that the positive electrode current collector lead section 3c and the negative electrode current collector lead section 4c are inserted into the folded tip sections (15a, 16a) of the positive electrode terminal 15 and the negative electrode terminal 16, respectively, because (1) the positive electrode terminal 15 or the negative electrode terminal 16 is thicker and, thus, has a higher mechanical strength than the positive electrode current collector 3a or the negative electrode current collector 4a so as to make it possible to increase the bonding strength, and (2) where the positive electrode current collector lead section 3c and the negative electrode current collector lead section 4c are inserted into the folded tip sections (15a, 16a) of the positive electrode terminal 15 and the negative electrode terminal 16, respectively, the area for supporting the positive electrode current collector 3a or the negative electrode current collector 4a is increased. Particularly, where a metal foil is used as the positive electrode current collector 3a or the negative electrode current collector 4a, it is possible to obtain a prominent effect because the metal foil is very thin, which has a thickness of several microns to scores of microns.

(Second Embodiment)

A nonaqueous electrolyte battery according to a second embodiment of the present invention is equal in construction to the nonaqueous electrolyte battery according to the first embodiment described above, except that, in the second embodiment, an insulating spacer is used as the insulating member in place of the insulating film used in the first embodiment.

It is possible to use, for example, polypropylene, polyethylene, polyethylene terephthalate, polyphenylene sulfide, polyimide, or polytetrafluoro ethylene (PTFE) as a material of the insulating spacer. Also, it is desirable for the insulating spacer to be formed of a material having a melting point higher than that of the inner surface of the case.

Figure 10:
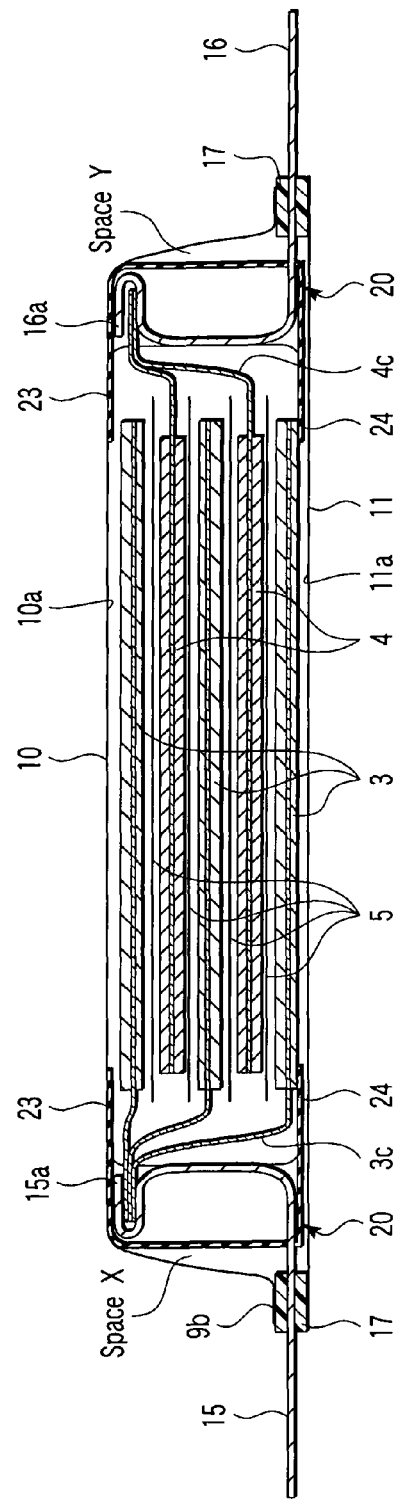
FIG. 10 is a vertical cross sectional view showing the construction of the nonaqueous electrolyte battery shown in FIG. 9.
Figure 8:
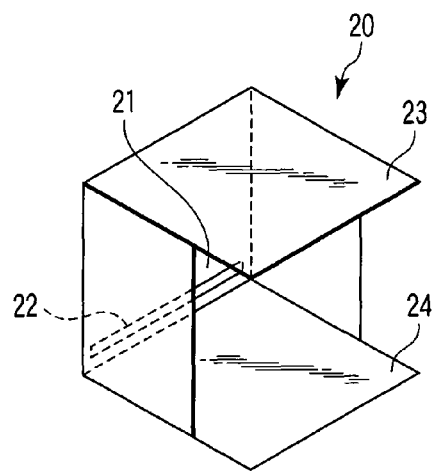
FIG. 8 is an oblique view exemplifying an insulating spacer used in a nonaqueous electrolyte battery according to a second embodiment of the present invention.
Figure 9:
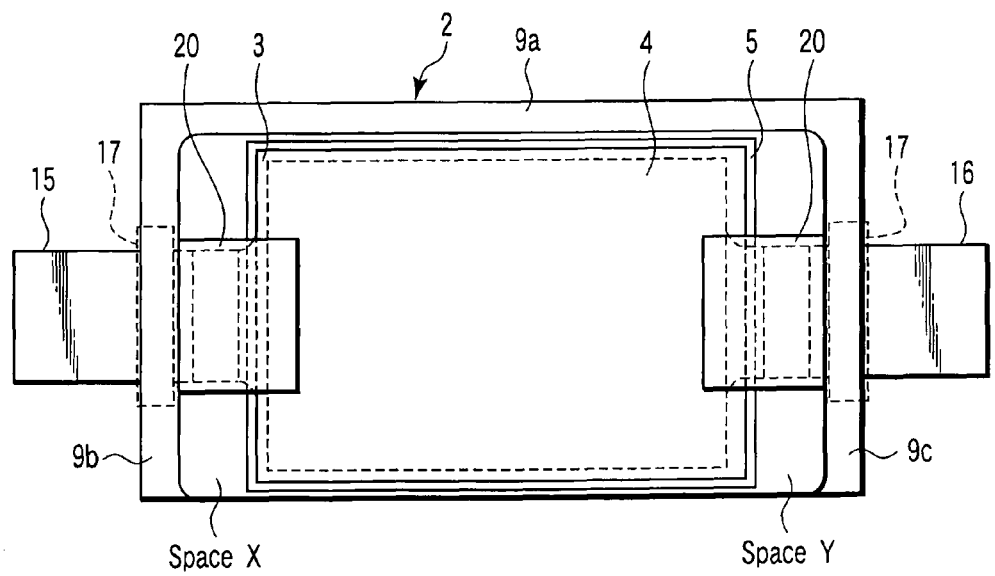
FIG. 9 is planar perspective view showing the construction of the flattened nonaqueous electrolyte battery having the insulating spacer shown in FIG. 8 incorporated therein.

The nonaqueous electrolyte battery according to the second embodiment of the present invention will now be described with reference to FIGS. 8 to 11. Incidentally, the reference numerals put in FIGS. 1 to 7 are also put to the same members of the nonaqueous electrolyte battery according to the second embodiment so as to avoid the description thereof. FIG. 8 is an oblique view exemplifying the insulating spacer used in the nonaqueous electrolyte battery according to the second embodiment of the present invention, FIG. 9 is a planar perspective view showing the construction of the a flattened nonaqueous electrolyte battery having the insulating spacer shown in FIG. 8 incorporated therein, and FIG. 10 is a vertical cross sectional view showing the construction of the nonaqueous electrolyte battery shown in FIG. 9. Further, FIG. 11 is a cross sectional view showing in a magnified fashion the main portion of the nonaqueous electrolyte battery shown in FIG. 10.

As shown in FIG. 8, a first insulating spacer 20 is shaped like a box having an open section in the side plane. An electrode terminal insertion hole 22 into which the electrode terminal is inserted is formed in a lower portion of a bottom plate 21 facing the open section. Also, the edge portions of the upper and lower plates 23, 24 protrude outward from the edge portions of the open section so as to cover the positive electrode current collector lead section 3c and the negative electrode current collector lead section 4c. The nonaqueous electrolyte battery is provided with two first insulating spacers 20 of the particular construction. As shown in FIG. 10, these two first insulating spacers 20 are arranged between the inner surface 10a in the bottom portion of the container 10 and the inner surface 11a of the lid 11. The inner surface 10a in the bottom portion of the container 10 is parallel to the electrode reaction surface of the electrode group 1, i.e., faces the upper surface of the electrode group 1 in the case of FIG. 10. The inner surface 10a of the bottom portion is called herein a first inner surface. Also, the inner surface 11a is parallel to the electrode reaction surface of the electrode group 1, i.e., faces the lower surface of the electrode group 1 in the case of FIG. 10. The inner surface 11a is called herein a second inner surface. One of the two first insulating spacers 20 is arranged to surround the positive electrode terminal 15 in the space X of the nonaqueous electrolyte battery, and the other first insulating spacer 20 is arranged in the space Y in a manner to surround the negative electrode terminal 16.

As shown in FIGS. 10 and 11, the upper plate 23 of the first insulating spacer 20 arranged in the space X is in contact with the inner surface of the bottom portion of the container 10 and covers the connecting section between the edge portion 15a and the positive electrode current collector lead section 3c. Also, as shown in FIGS. 10 and 11, the lower plate 24 of the first insulating spacer 20 is in contact with the inner surface 11a of the lid 11 and covers the positive electrode terminal 15 and the positive electrode current collector lead section 3c positioned in the vicinity of the inner surface 11a of the lid 11. The bottom plate 21 of the first insulating spacer 20 is arranged between the side surface of the container 10 and the positive electrode terminal 15. The tip portion of the positive electrode terminal 15 is drawn to the first sealed portion through the electrode terminal insertion hole 22 formed in the bottom plate 21.

As shown in FIG. 10, the upper plate 23 of the first insulating spacer 20 arranged in the space Y is in contact with the inner surface 10a in the bottom portion of the container 10 and covers the connecting section between the edge portion 16a and the negative electrode current collector lead section 4c. Also, as shown in FIG. 10, the lower plate 24 of the first insulating spacer 20 is in contact with the inner surface 11a of the lid 11 and covers the negative electrode terminal 16 and the negative electrode current collector lead section 4c positioned in the vicinity of the inner surface 11a of the lid 11. The tip portion of the negative electrode terminal 16 is drawn to the second sealed portion through the electrode terminal insertion hole 22 formed in the bottom plate 21.

If the positive electrode terminal 15 and the negative electrode terminal 16 are covered with the first insulating spacer 20 of the particular construction, the positive electrode terminal 15 and the negative electrode terminal 16 can be protected sufficiently because the position of the first insulating spacer 20 is scarcely deviated during the assembling stage of the battery or even if the battery is vibrated. Also, the first insulating spacer 20 is hollow and, thus, is low in weight. In addition, the first insulating spacer 20 performs the function of a provisional gas storing section when the inner pressure of the battery is elevated so as to make it possible to prevent the case 2 from being deformed by the gas pressure. Further, it is possible to allow the hollow portion of the first insulating spacer 20 to perform the function of an electrolyte reservoir.

Figure 13:
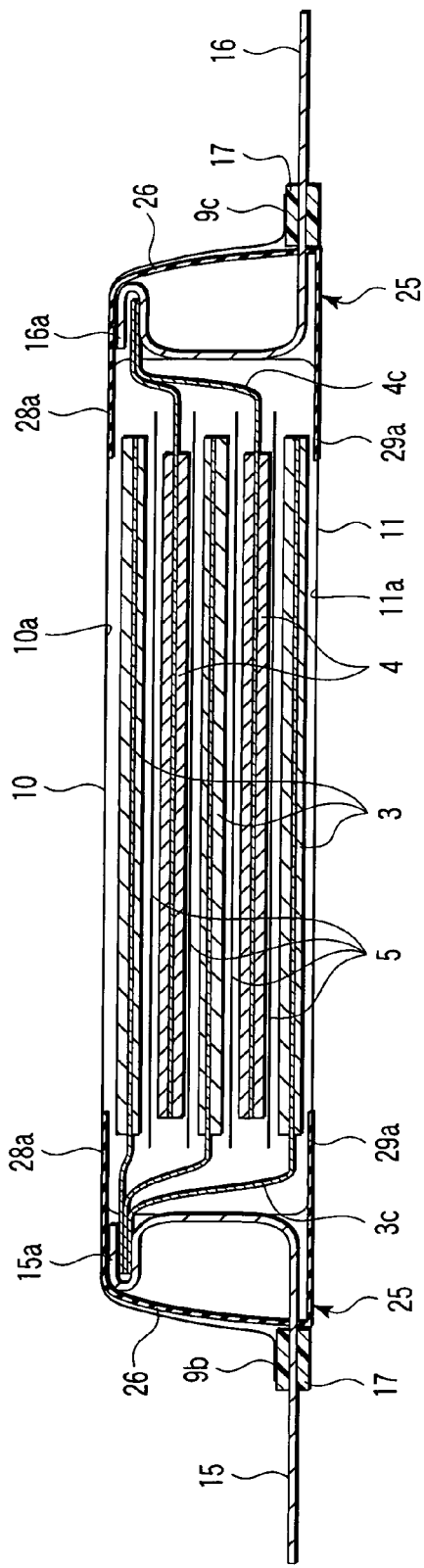
FIG. 13 is a vertical cross sectional view showing the construction of the nonaqueous electrolyte battery shown in FIG. 12.

Another example of the nonaqueous electrolyte battery according to the second embodiment will now be described with reference to FIGS. 12 to 14. Incidentally, the reference numerals put in FIGS. 1 to 11 are also put to the same members of the nonaqueous electrolyte battery shown in FIGS. 12 to 14 so as to avoid the description thereof. FIG. 12 is a planar perspective view showing another example of the nonaqueous electrolyte battery according to the second embodiment, FIG. 13 is a vertical cross sectional view showing the construction of the nonaqueous electrolyte battery shown in FIG. 12, and FIG. 14 is an oblique view showing the construction of an insulating spacer that is incorporated in the nonaqueous electrolyte battery shown in FIG. 12.

Figure 14:
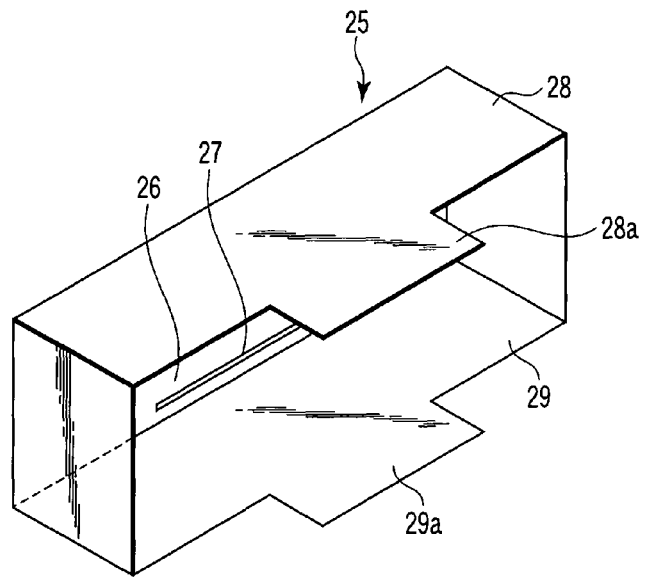
FIG. 14 is an oblique view showing the construction of the insulating spacer that is incorporated in the nonaqueous electrolyte battery shown in FIG. 12.

As shown in FIG. 14, a second insulating spacer 25 is shaped like a parallelepiped box having an open section on the side surface. An electrode terminal insertion hole 27 for inserting the electrode terminal is formed in a bottom plate 26 positioned to face the open section. Projections 28a, 29a for covering the current collector lead sections are formed to extend outward from the edge portions of upper and lower plates 28, 29, respectively. The nonaqueous electrolyte battery is provided with two second insulating spacers 25 of the particular construction. As shown in FIG. 13, these two second insulating spacers 25 are arranged between the first inner surface 10*a* and the second inner surface 11*a* of the case 2, i.e., arranged between the inner surface 10*a* in the bottom portion of the container 10 and the inner surface 11*a* of the lid 11. One of these second insulating spacers 25 is arranged to surround the positive electrode terminal 15, and the other second insulating spacer 25 is arranged to surround the negative electrode terminal 16.

One of the second insulating spacers 25 is arranged in the space X, i.e., the space between the container 10 and the edge surface of the electrode group in which the positive electrode terminal 15 protrudes. The upper plate 28 of the second insulating spacer 25 is interposed between the edge portion 15*a* of the positive electrode terminal 15 and the container 10. Also, as shown in FIG. 13, the projection 28*a* of the upper plate 28 covers the connecting section between the edge portion 15*a* and the positive electrode current collector lead section 3*c*. The lower plate 29 of the second insulating spacer 25 is interposed between the lid 11 and the positive electrode terminal 15. Also, as shown in FIG. 13, the projection 29*a* covers the positive electrode current collector lead section 3*c* positioned in the vicinity of the lower surface of the electrode group 1. The bottom plate 26 of the second insulating spacer 25 is interposed between the side surface of the container 10 and the positive electrode terminal 15. The tip portion of the positive electrode terminal 15 is drawn to the first sealed section through the electrode terminal insertion hole 27 formed in the bottom plate 26.

The other second insulating spacer 25 is arranged in the space Y, i.e., the space between the container 10 and the edge surface of the electrode group in which the negative electrode terminal 16 protrudes. The upper plate 28 of the second insulating spacer 25 is interposed between the edge portion 16*a* of the negative electrode terminal 16 and the container 10. Also, as shown in FIG. 13, the projection 28*a* of the upper plate 28 covers the connecting section between the edge portion 16*a* and the negative electrode current collector lead section 4*c*. The lower plate 29 of the second insulating spacer 25 is arranged between the lid 11 and the negative electrode terminal 16. Also, as shown in FIG. 13, the projection 29*a* of the lower plate 29 covers the negative electrode current collector lead section 4*c* positioned in the vicinity of the lower surface of the electrode group 1. The bottom plate 26 of the second insulating spacer 25 is arranged between the side surface of the container 10 and the negative electrode terminal 16. Further, the tip portion of the negative electrode terminal 16 is drawn to the second sealed portion via the electrode terminal insertion hole 27 formed in the bottom plate 26.

If the positive electrode terminal 15 and the negative electrode terminal 15 are covered with the second insulating spacer 25 of the particular construction, it is possible to prevent the positional deviation of the spacer and the deformation of the case when the inner pressure of the battery is elevated. In addition, it is possible to permit the second insulating spacer 25 to perform the function of an electrolyte reservoir. Further, since the second insulating spacer 25 permits suppressing the deformation of the case 2 when vibration or impact is applied to the battery, it is possible to further improve the reliability of the secondary battery against the external force such dropping or vibration. It is also possible to simplify the assembling process of the nonaqueous electrolyte battery by using the second insulating spacer 25.

(Third Embodiment)

Figure 15:
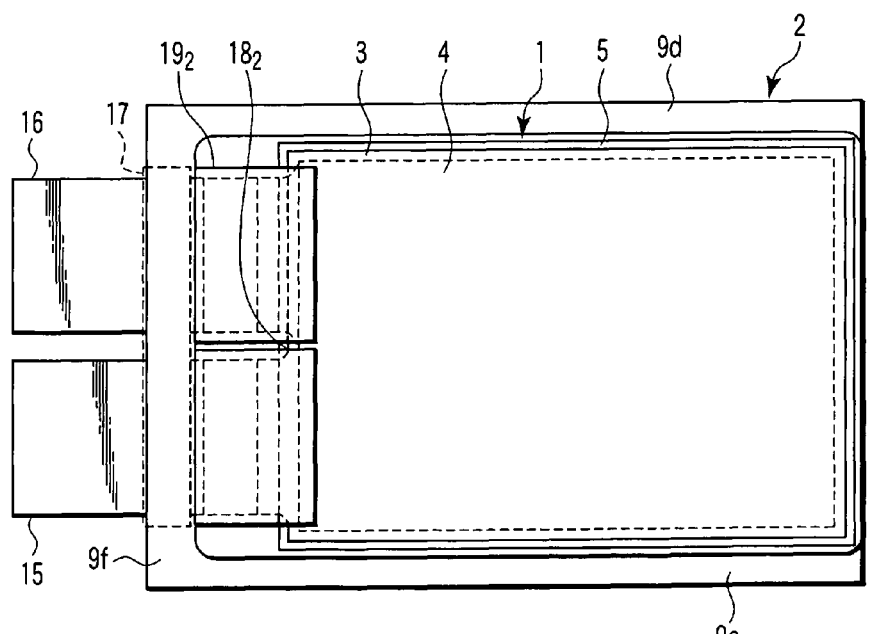
FIG. 15 is a planar perspective view showing the construction of a flattened nonaqueous electrolyte battery according to a third embodiment of the present invention, covering the case where the positive electrode terminal and the negative electrode terminal are equal to each other in the current flowing direction.
Figure 16:
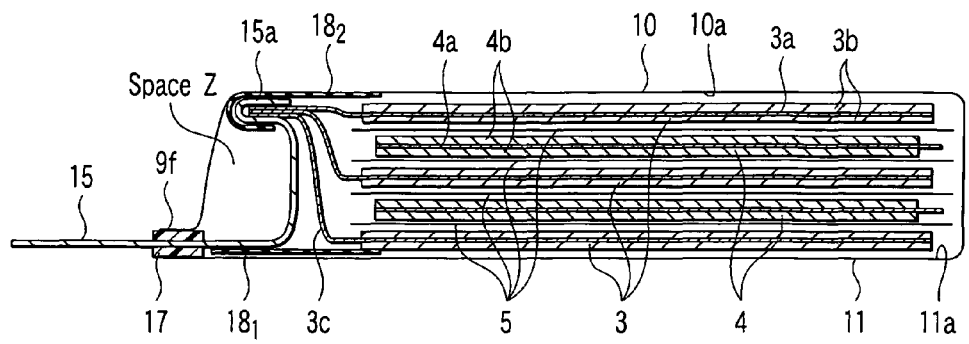
FIG. 16 is a vertical cross sectional view showing the construction of the nonaqueous electrolyte battery shown in FIG. 15.

A third embodiment of the present invention is directed to a nonaqueous electrolyte battery in which the positive electrode terminal and the negative electrode terminal are drawn in the same direction. Specifically, FIG. 15 is a planar perspective view showing the construction of a flattened nonaqueous electrolyte battery according to the third embodiment of the present invention, in which the positive electrode terminal and the negative electrode terminal are drawn in the same direction, and FIG. 16 is a vertical cross sectional view showing the construction of the nonaqueous electrolyte battery shown in FIG. 15. Incidentally, the reference numerals put in FIGS. 1 to 7 are also put to the same members of the nonaqueous electrolyte battery shown in FIGS. 15 and 16 so as to avoid the description thereof.

A flattened electrode group (power generating element) 1 is housed in a case 2. As shown in FIG. 15, the case 2 comprises a container 10 having longer side edge portions 9*d*, 9*e* formed in the open edge portions on the side of the two longer sides and a shorter side edge portion 9*f* formed in the open edge portion on the side of one of the two shorter sides, and a rectangular lid 11 formed to extend from the open edge section on the side of the other shorter side. The drawing shows the state that the lid 11 is folded toward the container 10 so as to permit the lid 11 to close the open section of the container 10. Each of the container 10 and the lid 11 is formed of, for example, a laminate film.

The longer side edge portions 9*d*, 9*e* are thermally fused to the lid 11 by using a thermoplastic resin layer positioned inside these fused portions and the lid. Also, the shorter side edge portion 9*f* is thermally fused to the lid 11 under the state that the band-like positive electrode terminal 15 and the band-like negative electrode terminal 16 are sandwiched between the fused portion 9*f* and the lid 11. The tip portions of the positive electrode terminal 15 and the negative electrode terminal 16 are drawn to the outside of the case through the region (i.e., a third sealed portion) between the shorter side edge portion 9*f* and the lid 11. The extending direction of the negative electrode terminal 16 (i.e., the current flowing direction) is equal to the extending direction of the positive electrode terminal 15 (i.e., the current flowing direction).

In the third sealed portion, the first insulating film 17 covers both surfaces of each of the positive electrode terminal 15 and the negative electrode terminal 16, i.e., the both surfaces that are positioned to face the shorter side edge portion 9*f* and the lid 11.

The edge portion 15*a* on the opposite side of the positive electrode terminal 15, i.e., the edge portion positioned within the case 2, is connected to a plurality of positive electrode current collector lead sections 3*c* so as to permit the positive electrode terminal 15 to be electrically connected to the positive electrode current collector 3*a*. The positive electrode terminal 15 is bent around the edge portion 15*a* of the positive electrode terminal toward the electrode group 1. Further, the positive electrode terminal 15 is curved toward the electrode group 1 within a space Z formed between the shorter side edge surface of the electrode group 1 and the case 2. The other edge portion of the positive electrode terminal 15 is drawn from the case 2 through the clearance between the shorter side edge portion 9*f* and the lid 11.

The positive electrode terminal 15 is positioned to face the edge surface of the electrode group 1. The area of the positive electrode terminal 15 facing the edge surface of the electrode group 1 is determined by a width $W_2$ and a height $t_2$.

A second insulating film $18_1$ is attached to the inner surface 11*a* of the lid 11 so as to be positioned to face the positive electrode terminal 15 and the positive electrode current collector lead section 3*c*. On the other hand, another second insulating film $18_2$ covers the connecting section between the edge portion 15*a* and the positive electrode current collector lead section 3*c*.

The edge portion on the opposite side of the negative electrode terminal 16, i.e., the edge portion positioned within the case 2, is connected to a plurality of negative electrode current collector lead sections 4c so as to permit the negative electrode terminal 16 to be electrically connected to the negative electrode current collector 4a. Incidentally, the protruding direction of the negative electrode current collector lead section 4c is equal to the protruding direction of the positive electrode current collector lead section 3c. The negative electrode terminal 15 is bent around the edge portion 16a of the negative electrode terminal 16 toward the electrode group 1. Further, the negative electrode terminal 16 is curved toward the electrode group 1 within the space Z. The other edge portion of the negative electrode terminal 16 is drawn from the case 2 through the clearance between the shorter side edge portion 9f and the lid 11.

The negative electrode terminal 16 is positioned to face the edge surface of the electrode group 1. The area of the positive electrode terminal 16 facing the edge surface of the electrode group 1 is determined by a width $W_3$ and a height $t_3$.

A third insulating film $19_1$ (not shown) is attached to the inner surface 11a of the lid 11 so as to face the negative electrode terminal 16 and the negative electrode current collector lead section 4c. Further, another third insulating film $19_2$ covers the connecting section between the edge portion 16a and the negative electrode current collector lead section 4c.

The positive electrode terminal 15 satisfies formula (1) given below and the negative electrode terminal 16 satisfies formula (2) given below:

$$t_2 \times W_2 \geq 0.25 S_p \tag{1}$$

$$t_3 \times W_3 \geq 0.25 S_n \tag{2}$$

In the third embodiment, $S_p$ and $S_n$ have the same value because the positive electrode terminal 15 and the negative electrode terminal 16 are drawn in the same direction.

Third embodiment in which the positive electrode terminal 15 and the negative electrode terminal 16 are drawn in the same direction differs from the construction in which the positive electrode terminal 15 and the negative electrode terminal 16 are drawn in the opposite directions in that, in the third embodiment, the positive electrode terminal 15 and the negative electrode terminal 16 are simultaneously positioned closer to or away from the electrode group 1 when the electrode 1 is moved in parallel. However, the third embodiment also permits lowering the breakage and the internal short circuit of the secondary battery when vibration or impact is applied to the secondary battery so as to improve the reliability and safety of the secondary battery against the impact and the vibration.

The upper limit of the area ($t_2 \times W_2$) in the rising portion of the positive electrode terminal 15 can be set at $0.45 S_p$. Also, the upper limit of the area ($t_3 \times W_3$) in the rising portion of the negative electrode terminal 16 can be set at $0.45 S_n$. By setting the upper limit at the value given above, it is possible to improve the reliability and safety of the secondary battery against vibration and impact without impairing the required sealing properties.

It is desirable for the positive electrode terminal 15 and the negative electrode terminal 16 to satisfy formulas (1)' and (2)' given below:

$$0.35 S_p \leq t_2 \times W_2 \leq 0.4 S_p \tag{1}'$$

$$0.35 S_n \leq t_3 \times W_3 \leq 0.4 S_n \tag{2}'$$

It is desirable for the sizes $t_2$ and $t_3$ of the positive electrode terminal 15 and the negative electrode terminal 16 to satisfy the formulas (3) and (4) given previously. In this case, it is possible to lessen the influence given by the vibration applied in the vertical direction to the surface of the electrode group 1 so as to make it possible to prevent sufficiently the positive electrode terminal 15 and the negative electrode terminal 16 from being broken.

It is desirable for the width $W_2$ of the positive electrode terminal 15 to satisfy formula (7) given below and for the width $W_3$ of the negative electrode terminal 16 to satisfy formula (8) given below:

$$0.25 W_1 \leq W_2 \leq 0.5 W_1 \tag{7}$$

$$0.25 W_1 \leq W_3 \leq 0.5 W_1 \tag{8}$$

Where the formulas (7) and (8) given above are satisfied, it is possible to provide a nonaqueous electrolyte battery excellent in the reliability and the safety against impact and vibration without impairing the sealing properties of the secondary battery. It is more desirable for the widths $W_2$ and $W_3$ noted above to satisfy the conditions of $0.35 W_1 \leq W_2 \leq 0.45 W_1$ and $0.35 W_1 \leq W_3 \leq 0.45 W_1$.

As described above, it is possible for the positive electrode terminal and the negative electrode terminal to be arranged to extend in the opposite directions or in the same direction. Where the positive electrode terminal and the negative electrode terminal are arranged to extend in the opposite directions, it is possible to obtain a strong restricting force relative to the displacement of the electrode group in the rotating direction. In addition, any of the positive electrode terminal and the negative electrode terminal is capable of supporting the electrode group even when the electrode group is moved in parallel. It is also possible to use a positive electrode terminal and a negative electrode terminal having a width not smaller than half the width of the electrode group so as to make it possible to increase the mechanical strength of the secondary battery.

In any of the first to third embodiments described above, it is possible for the positive electrode terminal and the negative electrode terminal to be drawn from the shorter side or the longer side of the electrode group. If the positive electrode terminal or the negative electrode terminal is drawn from the shorter side of the electrode group, it is possible to diminish the ratio by volume of the connecting section between the current collector and the positive or negative electrode terminal to the volume of the battery and, thus, the energy density can be increased easily. On the other hand, if the positive electrode terminal or the negative electrode terminal is drawn from the longer side of the electrode group, the width of the electrode terminal can be increased easily so as to lower the impedance and, thus, to obtain a secondary battery having a high output.

The shape of the electrode group is not limited to that described in the first to third embodiments described above. It is also possible to use the electrode group having various other shapes. For example, it is possible to prepare a stacked type electrode group by allowing a bag-shaped separator to house the positive electrode or the negative electrode, followed by alternately stacking the positive electrode and the negative electrode. It is also possible to insert the positive electrodes and the negative electrodes alternately in a band-like separator that is folded zigzag so as to obtain the stacked type electrode group. Further, it is possible to stack the positive electrode, the negative electrode and the separator, which are in the form of strips, one upon the other. Also, the extending method of the current collector is not limited to that employed in the first to third embodiments described above. The current collector can be drawn by various other methods. It is also possible for the current collector formed of a metal foil to include a portion not supporting the active material. In this case, the portion not supporting the active material is allowed to protrude from the electrode group so as to use the protruding portion as a current collector lead section. Alternatively, it is possible to bond a band-like current collector lead section to each of the positive electrode and the negative electrode and to permit the current collector lead section to protrude from the electrode group. It is also possible to use a wound-type electrode group. In this case, it is possible to take out a single or a plurality of current collector lead sections from the positive electrode and the negative electrode in the direction of the winding axis. Alternatively, a portion not supporting the active material is formed in one of the longer sides of each of a band-like positive electrode and negative electrode, and the portion not supporting the positive electrode active material is allowed to project in one direction of the winding axis and the portion not supporting the negative electrode active material is allowed to project in the opposite direction. It is possible to bundle the projecting portions not supporting the positive electrode active material by means of, for example, welding so as to form a single bundle and to connect the bundled projecting portions to the positive electrode terminal. Also, it is possible to bundle the projecting portions not supporting the negative electrode active material by means of, for example, welding so as to form a single bundle and to connect the bundled projecting portions to the negative electrode terminal.

Described in the following are the positive electrode, the negative electrode, the separator, the nonaqueous electrolyte, the case, the positive electrode terminal and the negative electrode terminal included in the nonaqueous electrolyte battery according to the first to third embodiments of the present invention.

1) Negative Electrode

The negative electrode can be prepared by coating one surface or both surfaces of a current collector with a paste of a negative electrode material that is obtained by, for example, dispersing a negative electrode active material, a conductive agent and a binder in a suitable solvent.

The negative electrode active material is formed of a material capable of absorbing-releasing lithium ions including, for example, a carbonaceous material, a metal oxide, a metal sulfide, a metal nitride, an alloy and a light metal.

The carbonaceous material capable of absorbing-releasing lithium ions includes, for example, coke, carbon fiber, pyrolytic vapor phase carbon, graphite, baked resin, baked body of mesophase pitch based carbon fiber, and baked body of mesophase globules. Particularly, it is desirable to use a mesophase pitch based carbon fiber or a mesophase globules that is graphitized at 2,500° C. or higher because the electrode capacity can be increased in this case.

The metal oxide used as the negative electrode active material includes, for example, a titanium-containing metal composite oxide, tin oxides such as $SnB_{0.4}P_{0.6}O_{3.1}$ and $SnSiO_3$, a silicon-based oxide such as SiO, and tungsten-based oxide such as $WO_3$. Among these metal oxides, it is desirable to use a negative electrode active material having a potential not lower than 0.5 V relative to the metal lithium such as a titanium-containing metal composite oxide like lithium titanate because, in the case of using the particular negative electrode active material, lithium dendrite is not generated on the negative electrode even in the case of rapidly charging the secondary battery so as to suppress the deterioration of the negative electrode.

The titanium-containing metal composite oxides include, for example, a titanium-based oxide that does not contain lithium in the synthesizing stage of the oxide, lithium-titanium oxide, and a lithium-titanium composite oxide obtained by substituting a foreign element for a part of the constituting elements of the lithium-titanium oxide. The lithium-titanium oxide includes, for example, lithium titanate having a spinel structure such as $Li_{4+x}Ti_5O_{12}$ (where $0 \leq x \leq 3$) and lithium titanate having a ramsdellite structure such as $Li_{2+y}Ti_3O_7$ ($0 \leq y \leq 3$).

The titanium-based oxides include, for example, $TiO_2$ and a metal composite oxide containing Ti at least one element selected from the group consisting of P, V, Sn, Cu, Ni, Co and Fe. It is desirable for $TiO_2$ to be of anatase type and to have a low crystallinity, which is obtained by the heat treatment at 300 to 500° C. Further, the metal composite oxide containing Ti and at least one element selected from the group consisting of P, V, Sn, Cu, Ni, Co and Fe includes, for example, $TiO_2$—$P_2O_5$, $TiO_2$—$V_2O_5$, $TiO_2$—$P_2O_5$—$SnO_2$ and $TiO_2$—$P_2O_5$-MeO (Me denoting at least one element selected from the group consisting of Cu, Ni, Co and Fe). It is desirable for the metal composite oxide to have a micro structure in which a crystalline phase and an amorphous phase are present together, or an amorphous phase alone is present singly. The micro structure of the particular construction permits markedly improving the charge-discharge cycle performance of the secondary battery. Particularly, it is desirable to use lithium-titanium oxide and a metal composite oxide containing Ti and at least one element selected from the group consisting of P, V, Sn, Cu, Ni, Co and Fe.

The metal sulfides include, for example, lithium sulfide ($TiS_2$), molybdenum sulfide ($MOS_2$), and iron sulfides (FeS, $FeS_2$, $Li_xFeS_2$). Also, the metal nitride includes, for example, lithium-cobalt nitride ($Li_xCo_yN$, $0<x<4$, $0<y<0.5$).

It is desirable to use lithium titanate having a spinel structure as the negative electrode active material.

It is possible to use a carbon material as the conductive agent. The carbon material includes, for example, acetylene black, carbon black, coke, carbon fiber and graphite.

The binder includes, for example, polytetrafluoro ethylene (PTFE), polyvinylidene fluoride (PVdF), ethylene-propylene-diene copolymer (EPDM), styrene-butadiene rubber (SBR), and carboxymethyl cellulose (CMC).

Various kinds of metal foils including for example, an aluminum foil, an aluminum alloy foil, a stainless steel foil, a titanium foil, a copper foil and a nickel foil can be used as the current collector in accordance with the potential of the negative electrode. It is desirable for the metal foil to have a thickness of 8 to 25 µm. Also, where the negative electrode potential is nobler than the metal lithium potential by at least 0.3 V by using, for example, lithium-titanium oxide as the negative electrode active material, it is desirable to use an aluminum foil or an aluminum alloy foil as the current collector because use of the aluminum foil or the aluminum alloy foil is effective for suppressing the battery weight.

It is desirable for the current collector of the negative electrode to be formed of aluminum foil or aluminum alloy foil. It is also desirable for the negative electrode current collector to have an average crystal grain diameter not larger than 50 µm. In this case, the mechanical strength of the current collector can be drastically increased so as to make it possible to increase the density of the negative electrode by applying the pressing under a high pressure to the negative electrode. As a result, the battery capacity can be increased. Also, since it is possible to prevent the dissolution and corrosion deterioration of the negative electrode current collector over a long over-discharge cycle under an environment of a high temperature not lower than, for example, 40° C., it is possible to suppress the elevation in the impedance of the negative electrode. Further, it is possible to improve the high-rate characteristics, the rapid charging properties, and the charge-discharge cycle characteristics of the battery. It is more desirable for the average crystal grain diameter of the negative electrode current collector to be not larger than 30 μm, furthermore desirably, not larger than 5 μm.

The average crystal grain diameter can be obtained as follows. Specifically, the texture of the current collector surface is observed with an electron microscope so as to obtain the number n of crystal grains present within an area of 1 mm×1 mm. Then, the average crystal grain area S is obtained from the formula "$S=1\times10^6/n$ (μm$^2$)", where n denotes the number of crystal grains noted above. Further, the average crystal grain diameter d (μm) is calculated from the area S by formula (A) given below:

$$d=2(S/\pi)^{1/2} \tag{A}$$

The aluminum foil or the aluminum alloy foil having the average crystal grain diameter not larger than 50 μm can be complicatedly affected by many factors such as the texture of the material, the impurities, the process conditions, the history of the heat treatments and the heating conditions such as the annealing conditions, and the crystal grain diameter can be adjusted by an appropriate combination of the factors noted above during the manufacturing process.

It is desirable for the aluminum foil or the aluminum alloy foil to have a thickness not larger than 20 μm, preferably not larger than 15 μm. Also, it is desirable for the aluminum foil to have a purity not lower than 99%. Further, it is desirable for the aluminum alloy to contain, for example, magnesium, zinc and silicon. On the other hand, it is desirable for the content of the transition metals such as iron, copper, nickel and chromium in the aluminum alloy to be not higher than 1%. Incidentally, where the secondary battery is mounted to a vehicle, it is particularly desirable to use an aluminum alloy foil as the negative electrode current collector.

Concerning the mixing ratio of the active material, the conductive agent and the binder in the negative electrode material, it is desirable for the negative electrode active material to be used in an amount of 80 to 95% by weight, for the conductive agent to be used in an amount of 3 to 20% by weight and for the binder to be used in an amount of 1.5 to 7% by weight.

2) Positive Electrode

The positive electrode can be prepared by coating one surface or both surfaces of a current collector with a paste of the positive electrode material prepared by, for example, dispersing the positive electrode active material, the conductive agent and the binder in a suitable solvent.

The positive electrode active material includes various oxides and sulfides including, for example, manganese dioxide ($MnO_2$), iron oxide, copper oxide, nickel oxide, lithium-manganese composite oxide, e.g., $Li_xMn_2O_4$ or $Li_xMnO_2$, lithium-nickel composite oxide, e.g., $Li_xNiO_2$, lithium-cobalt composite oxide, e.g., $Li_xCoO_2$, lithium-nickel-cobalt composite oxide, e.g., $LiNi_{1-y}Co_yO_2$, lithium-manganese-cobalt composite oxide, e.g., $LiMn_yCo_{1-y}O_2$, spinel type lithium-manganese-nickel composite oxide ($Li_xMn_{2-y}Ni_yO_4$), lithium-phosphorus oxide having an olivine structure ($Li_xFePO_4$, $Li_xFe_{1-y}Mn_yPO_4$, $Li_xCoPO_4$, etc.), iron sulfate ($Fe_2(SO_4)_3$), and vanadium oxide, e.g., $V_2O_5$. It is also possible to use as the positive electrode active material a conductive polymer such as polyaniline or polypyrrole, and organic and inorganic materials such as a disulfide series polymer material, sulfur (S), and fluorocarbon.

More desirable positive electrode active material for the secondary battery includes, for example, lithium-manganese composite oxide ($Li_xMn_2O_4$), lithium-nickel composite oxide ($Li_xNiO_2$), lithium-cobalt composite oxide ($Li_xCoO_2$), lithium-nickel-cobalt composite oxide ($Li_xNi_{1-y}Co_yO_2$), spinel type lithium-manganese-nickel composite oxide ($Li_xMn_{2-y}Ni_yO_4$), lithium-manganese-cobalt composite oxide ($Li_xMn_yCo_{1-y}O_2$) and lithium-iron phosphate ($Li_xFePO_4$). These positive electrode active materials permit increasing the battery voltage. Incidentally, it is desirable for x and y included in the chemical formulas given above to fall within a range of 0 to 1.

Also, it is possible to use lithium-nickel-cobalt-manganese composite oxide having a composition of $Li_aNi_bCo_cMn_dO_2$, where the molar ratios a, b, c and d are: $0 \leq a \leq 1.1$; $0.1 \leq b \leq 0.5$; $0 \leq c \leq 0.9$; $0.1 \leq d \leq 0.5$.

The conductive agent includes, for example, acetylene black, carbon black, synthetic graphite, natural graphite, and a conductive polymer.

The binder includes, for example, polytetrafluoro ethylene (PTFE), polyvinylidene fluoride (PVdF), a denatured PVdF having another substituent substituted therein for at least one of hydrogen and fluorine contained in PVdF, vinylidene fluoride-hexafluoro propylene copolymer, and vinylidene fluoride-tetrafluoro ethylene-hexafluoro propylene terpolymer.

The organic solvent used for dispersing the binder includes, for example, N-methyl-2-pyrrolidone (NMP) and dimethyl formamide (DMF).

The current collector includes, for example, an aluminum foil, an aluminum alloy foil, a stainless steel foil and a titanium foil. Each of these metal foils has a thickness of, for example, 8 to 25 μm.

It is desirable for the positive electrode current collector to be formed of an aluminum foil or an aluminum alloy foil, and it is desirable for the aluminum foil or the aluminum alloy foil used as the positive electrode current collector to have an average crystal grain diameter not larger than 50 μm, more desirably not larger than 30 μm, and furthermore desirably not larger than 5 μm. If the average crystal grain diameter is not larger than 50 μm, it is possible to drastically increase the mechanical strength of the aluminum foil or the aluminum alloy foil so as to make it possible to increase the density of the positive electrode because the positive electrode current collector can be pressed under a high pressure. It follows that it is possible to increase the battery capacity.

The aluminum foil or the aluminum alloy foil having the average crystal diameter not larger than 50 μm is affected in various fashions by many factors such as the material texture, the impurities, the process conditions, the history of the heat treatment and the annealing conditions, and the crystal grain diameter can be adjusted by an appropriate combination of the factors noted above during the manufacturing process.

It is desirable for the aluminum foil or the aluminum alloy foil to have a thickness not larger than 20 μm, more desirably not larger than 15 μm. It is desirable for the aluminum foil to have a purity not lower than 99%. It is desirable to use an aluminum alloy containing at least one element selected from the group consisting of magnesium, zinc and silicon. On the other hand, it is desirable for the amount of a transition metal such as iron, copper, nickel or chromium, which is contained in the aluminum alloy, to be not larger than 1%.

Concerning the mixing ratio of the active material, the conductive agent and the binder in the positive electrode material, it is desirable for the positive electrode active material to be used in an amount of 80 to 95% by weight, for the conductive agent to be used in an amount 3 to 20% by weight, and for the binder to be used in an amount of 1.5 to 7% by weight.

3) Separator

A porous separator can be used.

The porous separator includes, for example, a porous film and an unwoven fabric. The porous separator is formed of, for example, at least one synthetic resin selected from the group consisting of polyethylene, polypropylene, cellulose and polyvinylidene fluoride (PVdF). Particularly, it is desirable to use a porous film formed of polyethylene and/or polypropylene. In this case, the shut down function, in which the pores of the porous film are closed when the battery temperature is elevated so as to decrease markedly the charge-discharge current, can be imparted easily to the particular porous film, with the result that the safety of the secondary battery can be improved.

4) Nonaqueous Electrolyte

The nonaqueous electrolyte includes, for example, an organic liquid electrolyte prepared by dissolving at least one kind of a lithium salt selected from the group consisting of $LiBF_4$, $LiPF_6$, $LiAsF_6$, $LiClO_4$, $LiCF_3SO_3$, $LiN(CF_3SO_2)_2$, $LiN(C_2F_5SO_2)_2$, $Li(CF_3SO_2)_3C$, and $LiB[(OCO)_2]_2$ in an organic solvent in a concentration of 0.5 to 2 mol/L.

The organic solvent noted above includes, for example, cyclic carbonates such as propylene carbonate (PC) and ethylene carbonate (EC); linear carbonates such as diethyl carbonate (DEC), dimethyl carbonate (DMC), and methyl ethyl carbonate (MEC); linear ethers such as dimethoxy ethane (DME) and diethoxy ethane (DEE); cyclic ethers such as tetrahydrofuran (THF) and dioxolane (DOX); as well as γ-butyrolactone (GBL), acetonitrile (AN) and sulfolane (SL). These organic solvents can be used singly or in the form of a mixed solvent.

Also, it is possible to use a room temperature molten salt containing lithium ions (ionic liquid) as the nonaqueous electrolyte. In the case of selecting an ionic liquid formed of lithium ions, organic cations and anions and forming a liquid state under temperatures not higher than 100° C., preferably not higher than room temperature, it is possible to obtain a secondary battery that can be operated under a wide temperature range.

5) Case

The case is formed of a laminate film. It is desirable for the laminate film to have a thickness not larger than 0.2 mm.

It is possible for the laminate film to comprise a thermally fusible resin film (thermoplastic resin film) forming the innermost layer, an organic resin film having a rigidity and forming the outermost layer, and a metal foil such as an aluminum foil between the innermost layer and the outermost layer.

The thermally fusible resin film can be formed of, for example, a polyethylene (PE) film, a polypropylene (PP) film, a polypropylene-polyethylene copolymer film, an ionomer film or an ethylene vinyl acetate (EVA) film. On the other hand, the organic resin film having a rigidity can be formed of, for example, a polyethylene terephthalate (PET) film or a Nylon film.

In the portion where the positive electrode terminal or the negative electrode terminal extends to the outside through the case formed of the laminate film, it is necessary to prevent the metal foil included in the laminate film forming the case from being brought into an electric contact with the positive electrode terminal or the negative electrode terminal and to prevent the leakage of the liquid electrolyte and to prevent the entry of water or the outer atmosphere into the case. Such being the situation, it is desirable to arrange the insulating film in a manner to cover the both surfaces of the positive electrode terminal and the negative electrode terminal, as exemplified in FIG. 2. It is desirable for the particular insulating film to have a multi-layered structure constructed such that the layer facing the positive electrode terminal or the negative electrode terminal differs in characteristics from the layer facing the laminate film forming the case. For example, it is desirable to use (a) an insulating resin film of a two-layer structure consisting of an acid-denatured polyethylene layer, which is arranged to face the positive electrode terminal or the negative electrode terminal, and a polyethylene layer, or (b) an insulating film of a two-layer structure consisting of an acid-denatured polypropylene layer, which is arranged to face the positive electrode terminal or the negative electrode terminal, and a polypropylene layer. It is also desirable to use (c) an insulating resin film of a three-layer structure consisting of an intermediate polyethylene layer and acid-denatured polyethylene layers formed on both surfaces of the intermediate polyethylene layer or (d) an insulating resin film of a three-layer structure consisting of an intermediate polypropylene layer and acid-denatured polypropylene layers formed on both surfaces of the polypropylene layer.

It is desirable for the acid-denatured polyethylene noted above to be, for example, an acid-denatured low density linear polyethylene or an acid-denatured linear polyethylene.

It is desirable for the polyethylene noted above to be, for example, a medium or high density polyethylene.

Also, it is desirable for the polypropylene noted above to be, for example, a homopolymer-based polypropylene.

Further, it is desirable for the acid-denatured polypropylene to be, for example, a random copolymer-based polypropylene.

6) Positive Electrode Terminal and Negative Electrode Terminal

The positive electrode terminal can be formed of, for example, aluminum, titanium, an alloy thereof, or stainless steel. Also, the negative electrode terminal can be formed of nickel, copper or an alloy thereof. Where the negative electrode potential is nobler than the potential of metal lithium by at least 1 V, e.g., where lithium titanate is used as the negative electrode active material, the negative electrode terminal can be formed of aluminum or an aluminum alloy. In this case, it is desirable for each of the positive electrode terminal and the negative electrode terminal to be formed of aluminum or an aluminum alloy because the electrode terminals can be made light in weight and the electric resistance of the electrode terminals can be suppressed to a low level.

It is desirable for the mechanical strength of the positive electrode terminal or the negative electrode terminal not to exceed markedly the mechanical strength of the positive electrode current collector or the negative electrode current collector because, in this case, the stress concentration on the connecting portion between the electrode terminal and the current collector can be moderated. Where an ultrasonic welding, which is one of the preferred methods, is employed as the connecting means for connecting the electrode terminal to the current collector, it is desirable for the positive electrode terminal or the negative electrode terminal to have a small Young's modulus because a strong welding can be achieved easily. For example, it is desirable to use pure aluminum (order of JIS 1000) subjected to the annealing treatment as the material of the positive electrode terminal or the negative electrode terminal.

It is desirable for the positive electrode terminal to have a thickness of 0.05 to 0.5 mm, more preferably 0.1 to 0.3 mm.

Also, it is desirable for the negative electrode terminal to have a thickness of 0.05 to 0.5 mm, more preferably 0.1 to 0.3 mm.

(Fourth Embodiment)

A fourth embodiment of the present invention is directed to a battery pack comprising at least one nonaqueous electrolyte battery according to the first to third embodiments of the present invention. It is possible for the battery pack to include a single nonaqueous electrolyte battery or a plurality of nonaqueous electrolyte batteries. Where the battery pack includes a plurality of nonaqueous electrolyte batteries, it is desirable in view of the aspect of obtaining a high output to connect the unit cells of the nonaqueous electrolyte battery in series or in parallel so as to form a battery module.

Concerning the use of the battery pack according to the fourth embodiment, it is desirable to assume that the battery pack is used under a high temperature environment. The battery pack can be mounted to a vehicle such as a hybrid electric automobile having 2 to 4 wheel, an electric automobile having 2 to 4 wheels, or an assist bicycle. The battery pack can be used for the emergency of an electronic appliance, or mounted to a vacuum cleaner or an electromotive tool.

The nonaqueous electrolyte battery according to the first to third embodiments of the present invention is excellent in reliability and safety against vibration and impact. Therefore, the battery pack according to the fourth embodiment is particularly adapted for use under an environment in which vibration or impact is always applied to the battery as in a vehicle, a vacuum cleaner, or an electromotive tool.

An example of the battery pack according to the fourth embodiment will now be described with reference to FIGS. 17 and 18.

FIG. 17 is an oblique view showing in a dismantled fashion the construction of the battery pack according to the fourth embodiment.

As shown in FIG. 17, a plurality of plate-like unit cells 31, e.g., 8 unit cells 31, are stacked in the thickness direction so as to form a parallelepiped stacked body 32, i.e., a battery module. The nonaqueous electrolyte battery according to the third embodiment is used as the unit cell 31. In each unit cell 31, the positive electrode terminal 15 and the negative electrode terminal 16, which are connected to the positive electrode and the negative electrode, respectively, are drawn to the outside of the case in the same direction as described previously. A printed wiring board 33 is arranged on the side surface toward which protrude the positive electrode terminal 15 and negative electrode terminal 16.

The positive electrode terminal 15 is electrically connected to a positive electrode connector 35 via a wiring 34. Also, the negative electrode terminal 16 is electrically connected to a negative electrode connector 37 via a wiring 36. Each of the connectors 35 and 37, respectively, is connected to a counterpart connector mounted to the printed wiring board 33.

The stacked body 32 of the unit cells 31 is fixed by an adhesive tape 38. A protective sheet 39 formed of rubber or resin is arranged on each of the three side surfaces of the stacked body 32 excluding the side surface toward which protrude the positive electrode terminal 15 and the negative electrode terminal 16. Also, a protective block 40 formed of rubber or resin is arranged in the space between the side surface toward which protrude the positive electrode terminal 15 and the negative electrode terminal 16 and the printed wiring board 33.

The stacked body 32 is housed in a housing container 41 together with the protective sheets 39, the protective block 40 and the printed wiring board 33. Also, a lid 42 is mounted to close the upper opening of the housing container 41.

Each constituent of the battery pack will now be described. As shown in FIG. 18, a thermistor 43, a protective circuit 44 and a terminal 45 for current supply to the external equipment are mounted to the printed wiring board 33.

The thermistor 43 detects the temperature of the unit cell 31 and transmits the detection signal to the protective circuit 44.

Figure 18:
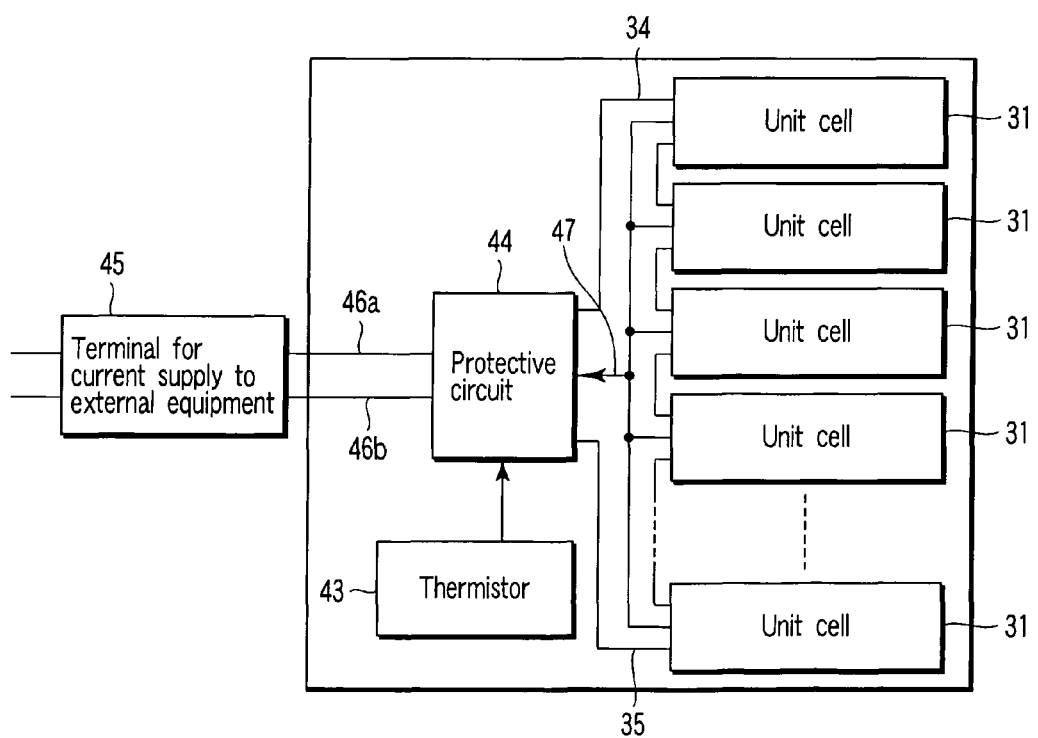
FIG. 18 is a block diagram showing the electric circuit of the battery pack shown in FIG. 17.

As shown in FIG. 18, the protective circuit 44 permits breaking wirings 46a, 46b between the protective circuit 44 and the terminal 45 under prescribed conditions. To be more specific, the wirings 46a, 46b are broken when, for example, the temperature detected by the thermistor 43 has been found to be higher than a preset value and when an over-charging, an over-discharging, an eddy current, etc. of the unit cell 31 have been detected. The detection method is applied to the individual unit cells 31 or to the battery module 32. Where the detection method is applied to the individual unit cells 31, it is possible to detect the battery voltage or to detect the positive electrode potential or the negative electrode potential. In the latter case, a lithium electrode is inserted as a reference electrode into each of the individual unit cells 31. In the case of FIG. 18, the protective circuit 44 is equipped with a circuit section (not shown) for monitoring the battery voltage. Each of the unit cells 31 is connected to the circuit section for monitoring the battery voltage via a wiring 47. According to the particular construction, the battery voltage of each of the cell units 31 can be detected by the protective circuit 44.

The battery pack according to this embodiment is excellent in the controllability of the positive electrode potential or the negative electrode potential by the detection of the battery voltage and, thus, is particularly adapted for use in the case where the protective circuit detects the battery voltage.

It is possible to use a thermally shrinkable tape in place of the adhesive tape 38. In this case, the protective sheets 39 are arranged on both sides of the stacked body 32 and, after a thermally shrinkable tube is wound about the stacked body 32, the thermally shrinkable tube is thermally shrunk so as to bind the stacked body 32.

Incidentally, the unit cells 31 shown in FIG. 17 are connected in series. However, it is also possible to connect the unit cells 31 in parallel so as to increase the capacity of the battery pack. Of course, it is possible to connect the assembled battery packs in series and in parallel.

It should also be noted that the embodiment of the battery pack can be changed appropriately depending on the use of the battery pack.

(Fifth Embodiment)

A fifth embodiment of the present invention is directed to a vehicle equipped with the battery pack according to the fourth embodiment. The vehicle noted above includes, for example, a hybrid electric automobile having 2 to 4 wheels, an electric automobile having 2 to 4 wheels, and an assist bicycle.

Figure 19:
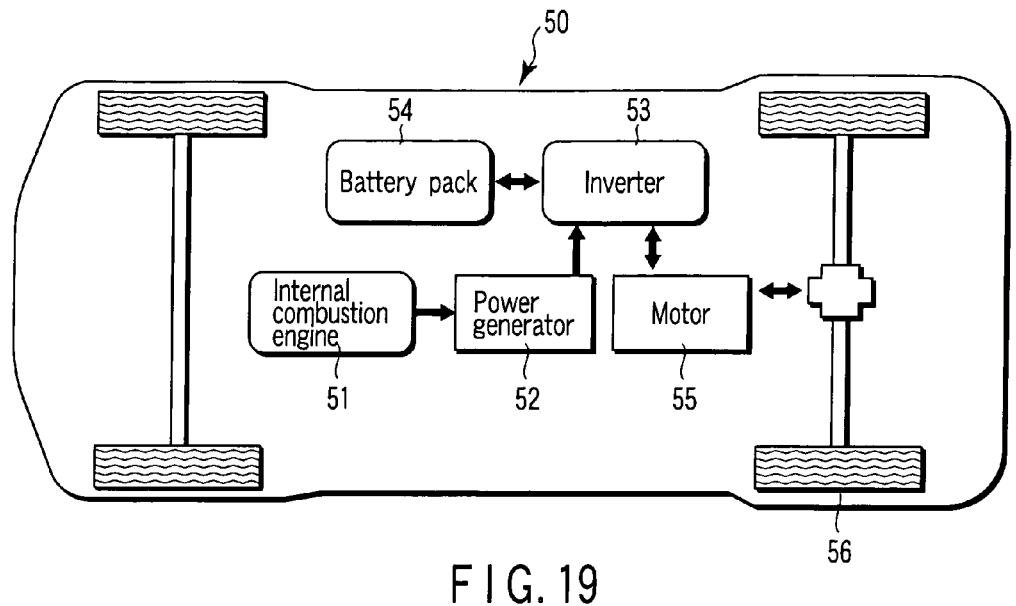
FIG. 19 schematically shows the construction of a series hybrid vehicle according to a fifth embodiment of the present invention.
Figure 20:
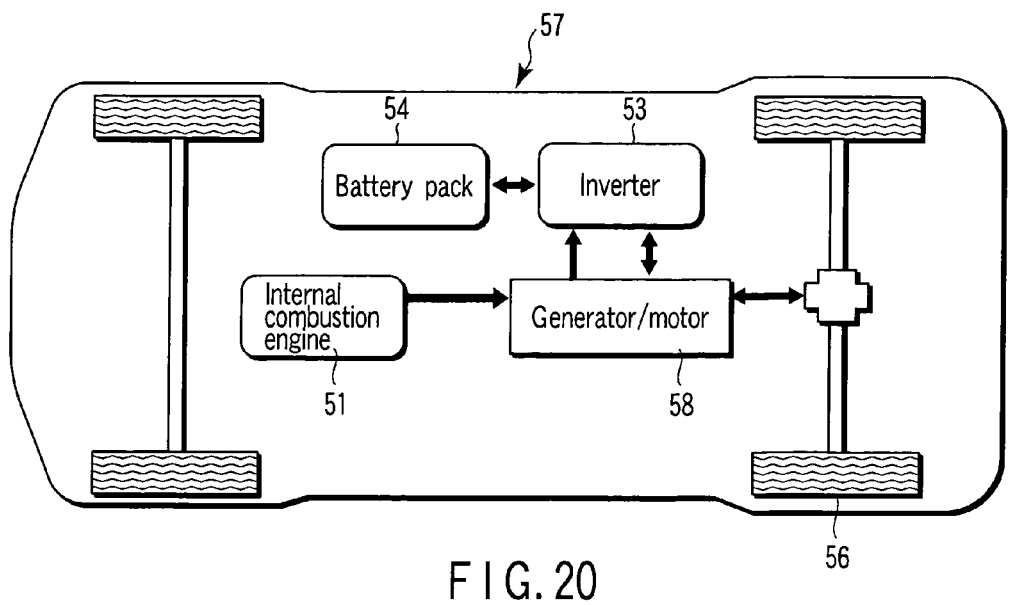
FIG. 20 schematically shows the construction of a parallel hybrid vehicle according to the fifth embodiment of the present invention.
Figure 21:
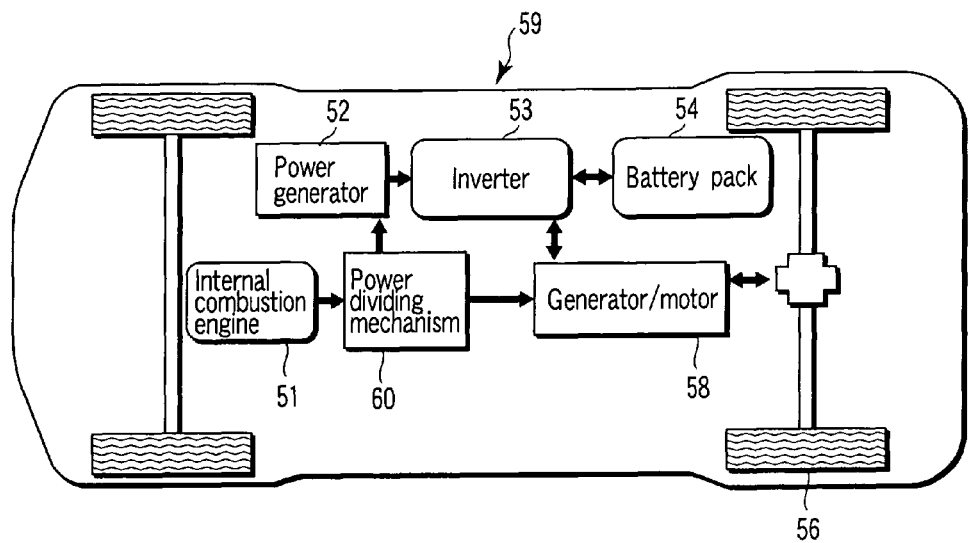
FIG. 21 schematically shows the construction of a series-parallel hybrid vehicle according to the fifth embodiment of the present invention.

FIGS. 19 to 21 show various type of hybrid vehicles in which an internal combustion engine and a motor driven by a battery pack are used in combination as the power source for the driving. For driving the vehicle, required is the power source exhibiting a wide range of the rotation speed and the torque depending on the running conditions of the vehicle. Since the torque and the rotation speed exhibiting an ideal energy efficiency are limited in the internal combustion engine, the energy efficiency is lowered under the driving conditions other than the limited torque and the rotation speed. Since the hybrid vehicle includes the internal combustion engine and the electric motor, it is possible to improve the energy efficiency of the vehicle. Specifically, the internal combustion engine is operated under the optimum conditions so as to generate an electric power, and the wheels are driven by the electric motor, or the internal combustion engine and the electric motor are operated simultaneously, thereby improving the energy efficiency of the vehicle. Also, by recovering the kinetic energy of the vehicle in the decelerating stage as the electric power, the running distance per unit amount of the fuel can be drastically increased, compared with the vehicle that is driven by the internal combustion engine alone.

The hybrid vehicle can be roughly classified into three types depending on the combination of the internal combustion engine and the electric motor.

FIG. 19 shows a hybrid vehicle 50 that is generally called a series hybrid vehicle. The motive power of an internal combustion engine 51 is once converted entirely into an electric power by a power generator 52, and the electric power thus converted is stored in a battery pack 54 via an inverter 53. The battery pack according to the fourth embodiment of the present invention is used as the battery pack 54. The electric power stored in the battery pack 54 is supplied to an electric motor 55 via the inverter 53, with the result that wheels 56 are driven by the electric motor 55. In other words, the hybrid vehicle 50 shown in FIG. 19 represents a system in which a power generator is incorporated into an electric vehicle. The internal combustion engine can be operated under highly efficient conditions and the kinetic energy of the internal combustion engine can be recovered as the electric power. On the other hand, the wheels are driven by the electric motor alone and, thus, the hybrid vehicle 50 requires an electric motor of a high output. It is also necessary to use a battery pack having a relatively large capacity. It is desirable for the rated capacity of the battery pack to fall within a range of 5 to 50 Ah, more desirably 10 to 20 Ah. Incidentally, the rated capacity noted above denotes the capacity at the time when the battery pack is discharged at a rate of 0.2C.

FIG. 20 shows the construction of a hybrid vehicle 57 that is called a parallel hybrid vehicle. A reference numeral 58 shown in FIG. 20 denotes an electric motor that also acts as a power generator. The internal combustion engine 51 drives mainly the wheels 56. The motive power of the internal combustion engine 51 is converted in some cases into an electric power by the power generator 58, and the battery pack 54 is charged by the electric power produced from the power generator 58. In the starting stage or the accelerating stage at which the load is increased, the driving force is supplemented by the electric motor 58. The hybrid vehicle 57 shown in FIG. 20 represents a system based on the ordinary vehicle. In this system, the fluctuation in the load of the internal combustion engine 51 is suppressed so as to improve the efficiency, and the regenerative power is also obtained. Since the wheels 56 are driven mainly by the internal combustion engine 51, the output of the electric motor 58 can be determined arbitrarily depending on the required ratio of the assistance. The system can be constructed even in the case of using a relatively small electric motor 58 and a relatively small battery pack 54. The rated capacity of the battery pack can be set to fall within a range of 1 to 20 Ah, more desirably 5 to 10 Ah.

FIG. 21 shows the construction of a hybrid vehicle 59 that is called a series-parallel hybrid vehicle, which utilizes in combination both the series type system and the parallel type system. A power dividing mechanism 60 included in the hybrid vehicle 59 divides the output of the internal combustion engine 51 into the energy for the power generation and the energy for the wheel driving. The series-parallel hybrid vehicle 59 permits controlling the load of the engine more finely than the parallel hybrid vehicle so as to improve the energy efficiency.

It is desirable for the rated capacity of the battery pack to fall within a range of 1 to 20 Ah, more desirably 5 to 10 Ah.

The battery pack according to an embodiment of the present invention is adapted for use in the series-parallel hybrid vehicle.

Figure 22:
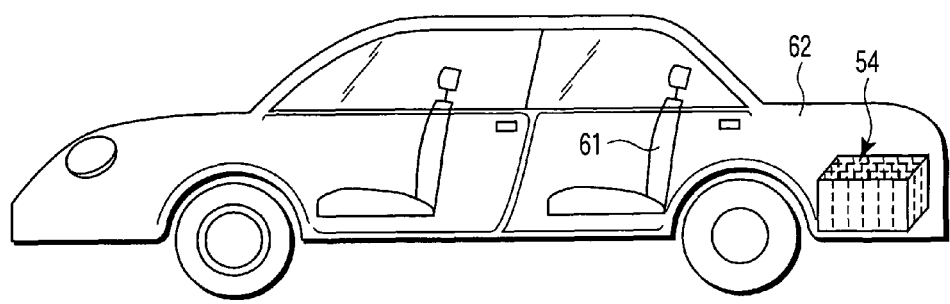
FIG. 22 schematically shows the construction of a vehicle according to the fifth embodiment of the present invention.

It is desirable for the battery pack 54 to be arranged in general in the site where the battery pack 54 is unlikely to be affected by the change in the temperature of the outer atmosphere and unlikely to receive an impact in the event of a collision. In, for example, a sedan type automobile shown in FIG. 22, the battery pack 54 can be arranged within a trunk room rearward of a rear seat 61. The battery pack 54 can also be arranged below or behind the rear seat 61. Where the battery has a large weight, it is desirable to arrange the battery pack 54 below the seat or below the floor in order to lower the center of gravity of the vehicle.

An electric vehicle (EV) is driven by the energy stored in the battery pack that is charged by the electric power supplied from outside the vehicle. Therefore, it is possible for the electric vehicle to utilize the electric energy generated at a high efficiency by, for example, another power generating equipment. Also, since the kinetic energy of the vehicle can be recovered as the electric power in the decelerating stage of the vehicle, it is possible to improve the energy efficiency during the driving of the vehicle. It should also be noted that the electric vehicle does not discharge at all the waste gases such as a carbon dioxide gas and, thus, the air pollution problem need not be worried about at all. On the other hand, since all the power required for the driving of the vehicle is produced by an electric motor, it is necessary to use an electric motor of a high output. In general, it is necessary to store all the energy required for one driving in the battery pack by one charging. It follows that it is necessary to use a battery having a very large capacity. It is desirable for the rated capacity of the battery pack to fall within a range of 100 to 500 Ah, more desirably 200 to 400 Ah.

The weight of the battery pack occupies a large ratio of the weight of the vehicle. Therefore, it is desirable for the battery pack to be arranged in a low position that is not markedly apart from the center of gravity of the vehicle. For example, it is desirable for the battery pack to be arranged below the floor of the vehicle. In order to allow the battery pack to be charged in a short time with a large amount of the electric power required for the one driving, it is necessary to use a charger of a large capacity and a charging cable. Therefore, it is desirable for the electric vehicle to be equipped with a charging connector connecting the charger and the charging cable. A connector utilizing the electric contact can be used as the charging connector. It is also possible to use a non-contact type charging connector utilizing the inductive coupling.

FIG. 23 exemplifies the construction of a hybrid motor bicycle. It is possible to construct a hybrid motor bicycle exhibiting a high energy efficiency and equipped with an internal combustion engine 64, an electric motor 65, and the battery pack 54 like the hybrid vehicle. The internal combustion engine 64 drives mainly the wheels 66. In some cases, the battery pack 54 is charged by utilizing a part of the motive power generated from the internal combustion engine 64. In the starting stage or the accelerating stage in which the load of the motor bicycle is increased, the driving force of the motor bicycle is supplemented by the electric motor 65. Since the wheels 66 are driven mainly by the internal combustion engine 64, the output of the electric motor 65 can be determined arbitrarily based on the required ratio of the supplement. The electric motor 65 and the battery pack 54, which are relatively small, can be used for constructing the system. It is desirable for the rated capacity of the battery pack to fall within a range of 1 to 20 Ah, more desirably 3 to 10 Ah.

FIG. 24 exemplifies the construction of an electric motor bicycle 67. The electric motor bicycle 67 is driven by the energy stored in the battery pack 54 that is charged by the supply of the electric power from the outside. Since all the driving force required for the driving the motor bicycle 67 is generated from the electric motor 65, it is necessary to use the electric motor 65 of a high output. Also, since it is necessary for the battery pack to store all the energy required for one driving by one charging, it is necessary to use a battery having a relatively large capacity. It is desirable for the rated capacity of the battery pack to fall within a range of 10 to 50 Ah, more desirably 15 to 30 Ah.

The present invention will now be described more in detail with reference to Examples of the present invention. Needless to say, the present invention is not limited to the following Examples as far as the subject matter of the present invention is not exceeded.

EXAMPLE 1

Lithium-cobalt oxide ($LiCoO_2$) was used as the positive electrode active material. A slurry was prepared by adding 8% by weight, based on the positive electrode, of a graphite powder used as a conductive agent and 5% by weight, based on the positive electrode, of PVdF used as a binder to the positive electrode active material, followed by dispersing the resultant mixture in a n-methyl pyrrolidone (NMP) solvent. Then, an aluminum foil having a thickness of 15 μm and a purity of 99.99% was coated with the slurry thus obtained, followed by drying and, then, pressing the aluminum foil coated with the slurry so as to obtain a positive electrode having an electrode density of 3.5 $g/cm^3$.

Then, strip-like positive electrode pieces were obtained by punching the positive electrode thus obtained such that the punched positive electrode piece had a slurry-coated portion sized at 68 mm×89 mm and an non-coated portion having a width of 22 mm and a length of 7 mm and formed at a shorter edge portion of the punched positive electrode piece. That portion of the positive electrode current collector which was not coated with the slurry performed the function of a positive electrode current collector lead section.

On the other hand, prepared as the negative electrode active material was lithium titanate of the spinel structure having a composition of $Li_4Ti_5O_{12}$. Then, the negative electrode active material was mixed with a graphite powder used as a conductive agent and PVdF used as a binder. The weight ratio of the negative electrode active material, the graphite power and PVdF was 90:7:3. The mixture thus obtained was dispersed in a n-methyl pyrrolidone (NMP) solvent so as to obtain a slurry. Further, an aluminum foil having a thickness of 15 μm and a purity of 99.99% was coated with the slurry thus obtained, followed by drying and, then, pressing the aluminum foil coated with the slurry so as to obtain a negative electrode having an electrode density of 2.2 $g/cm^3$.

Then, strip-like negative electrode pieces were obtained by punching the negative electrode thus obtained such that the punched negative electrode piece had a slurry-coated portion sized at 67 mm×88 mm and an non-coated portion formed at a shorter edge portion of the punched negative electrode piece. The non-coated portion had a width of 22 mm and a length of 7 mm. That portion of the negative electrode current collector which was not coated with the slurry performed the function of a negative electrode current collector lead section.

In the next step, a separator formed of a porous polyethylene film having a thickness of 20 μm and a width of 93 mm was arranged lateral, and the positive electrode piece was disposed on the left edge portion of the separator such that the positive electrode current collector lead section projected from the upper portion, and the separator was folded along the right edge of the positive electrode piece (procedure A). Then, the negative electrode piece was disposed on that portion of the separator which was positioned on the positive electrode piece such that the slurry-coated portion of the negative electrode was overlapped on the positive electrode and that the negative electrode current collector lead section was allowed to protrude from the lower portion, followed by folding the separator along the left edge of the negative electrode (procedure B). The procedures A and B were repeated so as to stack 31 positive electrodes and 30 negative electrodes one upon the other with the separator interposed between the positive electrode and the negative electrode, and a polyester tape was attached to a part of the edge section of the stacked structure so as to fix the electrodes, thereby manufacturing an electrode group. The electrode group thus manufactured had a flattened shape and was constructed such that the positive electrode current collector lead section and the negative electrode current collector lead section were projected from one edge and the other edge, respectively, of the electrode group. Further, the electrode group was sandwiched between flat plates and pressed so as to adjust the shape and to obtain an electrode group having a thickness $t_1$ of 5 mm.

Further, each of a band-like positive electrode terminal having a thickness of 0.2 mm and formed of aluminum and a band-like negative electrode terminal having a thickness of 0.2 mm and formed of aluminum was bent in the shape as shown in FIG. 2. In the following description, the positive electrode terminal or the negative electrode terminal that is shaped as shown in FIG. 2 is called a substantially U-shaped electrode terminal. The U-shaped positive electrode terminal 15 was connected to the positive electrode current collector lead section by means of an ultrasonic welding. Likewise, the U-shaped negative electrode terminal 16 was connected to the negative electrode current collector lead section by means of an ultrasonic welding. Each of the width $W_2$ of the positive electrode terminal and the width $W_3$ of the negative electrode terminal was found to be 22 mm. Also, each of a height $t_2$ of the positive electrode terminal in the direction perpendicular to the electrode reaction surface of the electrode group and a height $t_3$ of the negative electrode terminal in the direction perpendicular to the electrode reaction surface of the electrode group was found to be 4.75 mm. It follows that each of the area $S_2$ calculated by $t_2 \times W_2$ and the area $S_3$ calculated by $t_3 \times W_3$ was found to be 105 $mm^2$.

The width $W_1$ of the electrode group defined by a length of the electrode group in a direction perpendicular to the extending directions of the positive electrode terminal and the negative electrode terminal was 70 mm. On the other hand, the thickness t1 of the electrode group 1 was 5 mm, as pointed out above. Therefore, each of the areas $S_p$ and $S_n$, which are calculated by $t_1 \times W_1$, was 350 $mm^2$. It follows that the secondary battery for Example 1 formed the relationships of $S_2 = 0.3 S_p$ and $S_3 = 0.3 S_n$.

Also, the sizes $t_1$, $t_2$ and $t_3$ were found to have a relationship of $t_2 = t_3 = 0.95 t_1$ so as to satisfy the formulas (3) and (4). Also, the relationship of $W_1$, $W_2$ and $W_3$ were found to satisfy the formulas (5) and (6).

Incidentally, the thickness $t_1$ and the width $W_1$ of the electrode group were measured by applying a load of 1 (N) to a disk-like measuring element having a diameter of 10 mm.

An insulating tape made of polyimide was attached to cover the both surfaces of the connecting section between the positive electrode terminal and the positive electrode current collector lead section and the connecting section between the negative electrode terminal and the negative electrode current collector lead section.

A bath tub-shaped drawing mold sized at 70 mm×110 mm and having a depth of 5.5 mm was applied to a laminate film prepared by laminating a Nylon film, an aluminum foil and a polyethylene film and having a thickness of 0.1 mm so as to manufacture the case.

Also, a liquid nonaqueous electrolyte was prepared by dissolving LiBF$_4$ used as a lithium salt in an amount of 2.0 mol/L in a mixed solvent prepared by mixing ethylene carbonate (EC) and γ-butyrolactone at a mixing ratio by volume of 1:2.

The electrode group was housed in the case and the nonaqueous electrolyte was poured into the case. Also, insulating films each consisting of a polyethylene layer and a denatured polyethylene layer were arranged between the shorter side edge portions of the case and the lid in a manner to cover the both surfaces of the positive electrode terminal and the both surfaces of the negative electrode terminal.

Manufactured by using the members described above was a flattened nonaqueous electrolyte battery constructed as shown in FIGS. 1 and 2 and having a thickness of 5.5 mm, a width of 75 mm and a height of 120 mm.

EXMAPLE 2

A nonaqueous electrolyte battery was assembled as in Example 1, except that each of the width W$_2$ of the positive electrode terminal and the width W$_3$ of the negative electrode terminal was set at 37 mm, and each of the areas S$_2$ and S$_3$ was set at 176 mm$^2$.

EXAMPLE 3

A nonaqueous electrolyte battery was assembled as in Example 1, except that each of the width W$_2$ of the positive electrode terminal and the width W$_3$ of the negative electrode terminal was set at 59 mm, and each of the areas S$_2$ and S$_3$ was set at 280 mm$^2$.

EXAMPLE 4

A nonaqueous electrolyte battery was assembled as in Example 1, except that each of the width W$_2$ of the positive electrode terminal and the width W$_3$ of the negative electrode terminal was set at 42 mm, and each of the rising size t$_2$ of the positive electrode terminal and the rising size t$_3$ of the negative electrode terminal was set at 2.5 mm.

EXAMPLE 5

A positive electrode and a negative electrode were manufactured as in Example 1.

Then, strip-shaped positive electrode pieces were obtained by punching the positive electrode such that the positive electrode piece included a slurry-coated portion sized at 68 mm×89 mm and a non-coated portion having a width of 22 mm and a length of 7 mm and positioned 3 mm away from the left edge of the shorter side. The portion not coated with the slurry constituted a positive electrode current collector lead section. Further, strip-shaped negative electrode pieces were obtained by punching the negative electrode such that the negative electrode piece included a slurry-coated portion sized at 67 mm×88 mm and a non-coated portion having a width of 22 mm and a length of 7 mm and positioned at the right edge of the shorter side. The portion not coated with the slurry constituted a negative electrode current collector lead section.

In the next step, a separator formed of a porous polyethylene film having a thickness of 20 μm and a width of 93 mm was arranged lateral, and the positive electrode piece was disposed on the left edge portion of the separator such that the positive electrode current collector lead section projected from the upper left side, and the separator was folded along the right edge of the positive electrode piece (procedure C). Then, the negative electrode piece was disposed on that portion of the separator which was positioned on the positive electrode piece such that the slurry-coated portion of the negative electrode was overlapped on the positive electrode and that the negative electrode current collector lead section was allowed to protrude from the upper right side, followed by folding the separator along the left edge of the negative electrode piece (procedure D). The procedures C and D were repeated so as to stack 31 positive electrodes and 30 negative electrodes one upon the other with the separator interposed between the positive electrode and the negative electrode, and a polyester tape was attached to a part of the edge section of the stacked structure so as to fix the electrodes, thereby manufacturing an electrode group.

The electrode group thus manufactured had a flattened shape and was constructed such that the positive electrode current collector lead section was allowed to project from the shorter side on the left edge of the electrode group and the negative electrode current collector lead section was also allowed to project from the shorter side on the right edge of the electrode group. Further, the electrode group was sandwiched between flat plates and pressed so as to adjust the shape and to obtain an electrode group having a thickness t$_1$ of 5 mm.

As shown in FIG. 16, the positive electrode terminal having a thickness of 0.2 mm, formed of aluminum, and bent substantially in a U-shape as a whole was connected to the positive electrode current collector lead section by means of an ultrasonic welding. Likewise, the negative electrode terminal having a thickness of 0.2 mm, formed of aluminum, and bent substantially in a U-shape as a whole was connected to the negative electrode current collector lead section by means of an ultrasonic welding. Each of the width W$_2$ of the positive electrode terminal and the width W$_3$ of the negative electrode terminal was found to be 22 mm. Also, each of the rising size t$_2$ of the positive electrode terminal and the rising size t$_3$ of the negative electrode terminal was found to be 4.75 mm. Also, the width W$_1$ of the electrode group defined by a length of the electrode group in a direction perpendicular to the extending directions of the positive electrode terminal and the negative electrode terminal was found to be 70 mm.

As shown in Table 1, the secondary battery for Example 5 satisfied the formulas (1) to (4), (7) and (8).

An insulating film made of polyimide was attached in a manner to cover the both surfaces of the connecting section between the positive electrode terminal and the positive electrode current collector lead section and the both surfaces of the connecting section between the negative electrode terminal and the negative electrode current collector lead section.

A bath tub-shaped drawing mold sized at 70 mm×100 mm and having a depth of 5.5 mm was applied to a laminate film prepared by laminating a Nylon film, an aluminum foil and a polyethylene film and having a thickness of 0.1 mm so as to manufacture the case.

The electrode group was housed in the case and the nonaqueous electrolyte of the composition similar to that described previously in conjunction with Example 1 was poured into the case. Also, an insulating film consisting of polyethylene and a denatured polyethylene was arranged between the shorter side edge portion of the case and the lid such that the both surfaces of each of the positive electrode terminal and the negative electrode terminal were covered with the insulating film.

Manufactured by using the members described above was a flattened nonaqueous electrolyte battery constructed as shown in FIGS. 15 and 16 and having a thickness of 5.5 mm, a width of 80 mm and a height of 105 mm.

EXAMPLE 6

A nonaqueous electrolyte battery was assembled as in Example 1, except that each of the width $W_2$ of the positive electrode terminal and the width $W_3$ of the negative electrode terminal was set at 30 mm, and each of the rising size $t_2$ of the positive electrode terminal 15 and the rising size $t_3$ of the negative electrode terminal 16 was set at 3.5 mm.

EXAMPLE 7

Prepared as the negative electrode active material was a powder of mesophase pitch based graphite fiber subjected to the baking at 3,000° C. Then, a slurry was prepared by dispersing in water a mixture consisting of the negative electrode active material, a synthetic graphite having an average particle diameter of 5 μm, carboxymethyl cellulose and styrene-butadiene rubber, which were mixed at the weight ratio of 87:10:1:2. Further, a copper foil having a thickness 12 μm and a purity of 99.99% was coated with the slurry thus prepared, followed by drying and, then, pressing the copper foil coated with the slurry so as to obtain a negative electrode having an electrode density of 1.5 g/cm³.

The negative electrode was punched so as to obtain strip-shaped negative electrode pieces each having a slurry-coated portion sized at 67 mm×88 mm and a non-coated portion having a width of 22 mm and length of 7 mm and positioned at the shorter side of the negative electrode piece. The non-coated portion formed a negative electrode current collector lead section.

The material of the negative electrode terminal was changed to nickel.

Further, a nonaqueous electrolyte battery of the construction similar to that shown in FIG. 1 was assembled as in Example 1, except that used were the negative electrode and the negative electrode terminal described above.

EXAMPLE 8

A nonaqueous electrolyte battery was assembled as in Example 5, except that the negative electrode was manufactured as in Example 7 and the material of the negative electrode terminal was changed to nickel.

EXAMPLE 9

A positive electrode and a negative electrode were manufactured as in Example 1.

Then, the positive electrode was cut such that a portion not coated with the slurry of the positive electrode material (i.e., positive electrode current collector lead section) having a width of 10 mm, was formed in one edge portion on the longer side of a band-like slurry-coated portion having a longer width of 89 mm, thereby obtaining a positive electrode piece having 99 mm of the shorter side and 2.2 m of the longer side. Likewise, the negative electrode was cut such that a portion not coated with the slurry of the negative electrode material (i.e., a negative electrode current collector lead section) having a width of 10 mm, was formed in one edge portion on the longer side of a band-like slurry-coated portion having a longer width of 88 mm, thereby obtaining a negative electrode piece having 98 mm of the shorter side and 2.1 m of the longer side.

A separator having a width of 93 mm and formed of a porous polyethylene film was interposed between the positive electrode piece and the negative electrode piece, followed by spirally winding the resultant laminate structure. In this case, the slurry-coated portion of the positive electrode piece was allowed to face the slurry-coated portion of the negative electrode piece with the separator interposed therebetween. Then, the spirally wound structure was held between flat plates and pressed so as to obtain a flattened electrode group. A positive electrode current collector lead section was allowed to protrude from the electrode group in one direction parallel to the winding axis of the wound structure and a negative electrode current collector lead section was allowed to protrude from the electrode group in the opposite direction. The electrode group was found to have 5 mm of a thickness $t_1$, 70 mm of a width $W_1$ in a direction perpendicular to the extending direction of the positive electrode terminal and the extending direction of the negative electrode terminal, and a height of 107 mm.

Finally, a nonaqueous electrolyte battery was manufactured as in Example 1, except that the electrode group described above was used for manufacturing the nonaqueous electrolyte battery.

EXAMPLES 10 TO 13

A nonaqueous electrolyte battery was manufactured as in Example 1, except that the values of $(S_2/S_p)$, $(S_3/S_n)$, $(t_2/t_1)$, $(t_3/t_1)$, $(W_2/W_1)$ and $(W_3/W_1)$ were set as shown in Table 1.

EXAMPLE 14

A nonaqueous electrolyte battery was manufactured as in Example 1, except that the material of the positive electrode terminal was changed into an aluminum alloy having a composition of Al-1.2Mn-0.2Mg (wt %) and the material of the negative electrode terminal was changed into an aluminum alloy having a composition of Al–1.2Mn–0.2Mg (wt %)

COMPARATIVE EXAMPLE 1

Figure 25:
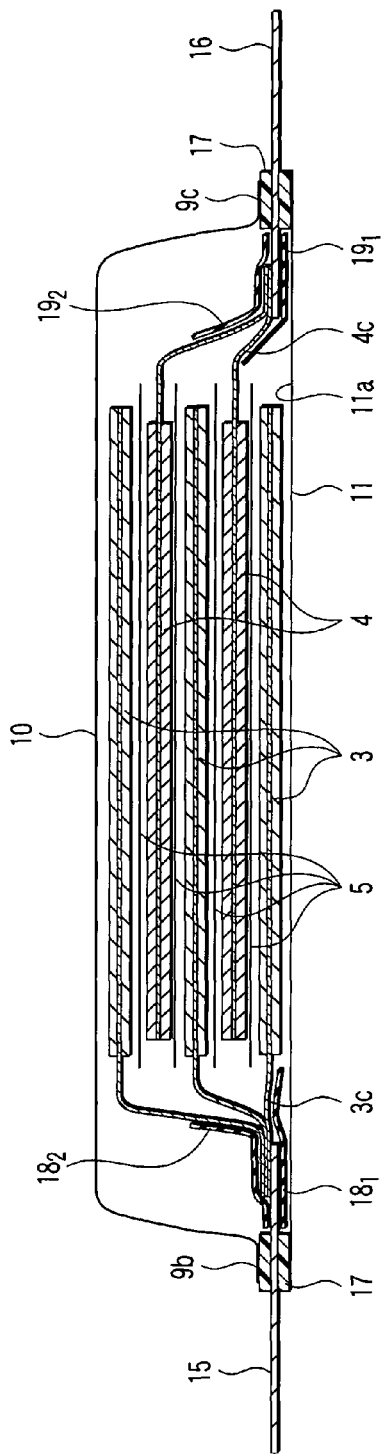
FIG. 25 is a planar perspective view showing the construction of a flattened nonaqueous electrolyte battery for Comparative Example 1.

A nonaqueous electrolyte battery constructed as shown in FIG. 25 was manufactured as in Example 1, except that the positive electrode terminal and the negative electrode terminal were shaped as described in the following.

Specifically, used were a band-like positive electrode terminal 15 and a band-like negative electrode terminal 16, which were not bent. A plurality of positive electrode current collector lead sections 3c were disposed on one edge portion of the band-like positive electrode terminal 15 and bonded to the positive electrode terminal 15 by means of an ultrasonic welding. The height of the connected portion was 1.0 mm. The other edge portion of the positive electrode terminal 15 was drawn to the outside of the case via the first sealed portion. Likewise, a plurality of negative electrode current collector lead sections 4c were disposed on one edge portion of the band-like negative electrode terminal 16 and bonded to the negative electrode terminal 16 by means of an ultrasonic welding. The height of the connected portion was 1.0 mm. The other edge portion of the negative electrode terminal 16 was drawn to the outside of the case via the second sealed portion. Each of the positive electrode terminal 15 and the negative electrode terminal 16 did not have a rising section.

Each of the areas $S_2$ and $S_3$ was found to be 22 mm² when calculated on the basis that the height of the connected portion between the positive electrode terminal and the positive electrode current collector lead section was regarded as $t_2$ and the height of the connected portion between the negative electrode terminal and the negative electrode current collector lead section was regarded as $t_3$. It follows that the areas $S_2$ and $S_3$ were: $S_2=0.06S_p$; $S_3=0.06S_n$. Also, the rising sizes $t_1$, $t_2$ and $t_3$ had a relationship of: $t_2=t_3=0.2t_1$.

COMPARATIVE EXAMPLE 2

Figure 26:
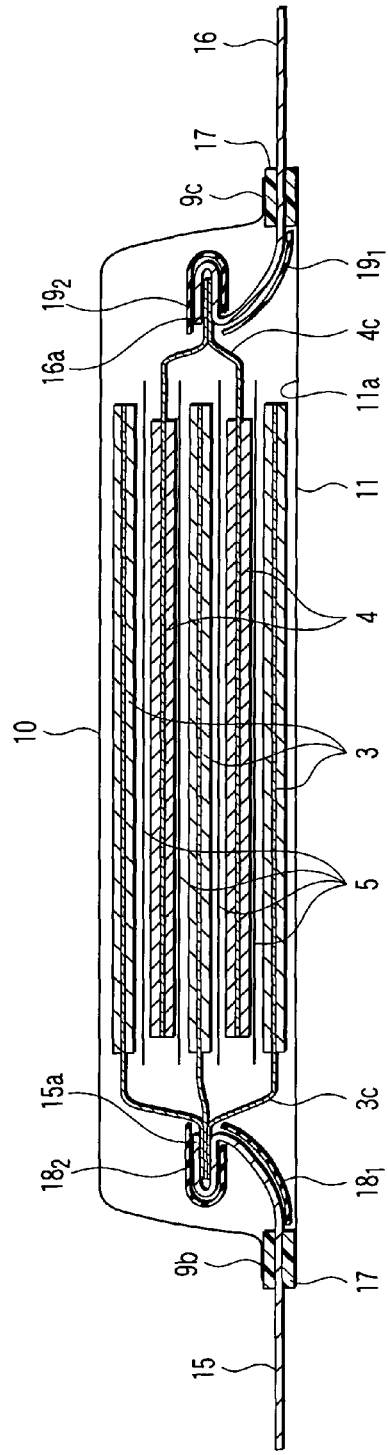
FIG. 26 is a planar perspective view showing the construction of a flattened nonaqueous electrolyte battery for Comparative Example 2.

A nonaqueous electrolyte battery constructed as shown in FIG. 26 was manufactured as in Example 1, except that those portions of the positive electrode terminal and the negative electrode terminal which were positioned within the case were shaped as described in the following.

Specifically, as shown in FIG. 26, the positive electrode current collector lead section 3c was connected to the edge portion 15a of the positive electrode terminal 15 by means of an ultrasonic welding. The edge portion of the positive electrode terminal 15 was once folded to extend toward the electrode group 1 from the connecting portion at which the positive electrode terminal 15 was connected to the positive electrode current collector lead section 3c and, then, bent in the opposite direction so as to be drawn to the outside through the clearance between the shorter side sealed portion 9b and the lid 11. The positive electrode terminal 15 thus obtained was shaped substantially like a letter S.

Likewise the negative electrode current collector lead section 4c was connected to the edge portion 16a of the negative electrode terminal 16 by means of an ultrasonic welding. The tip portion of the negative electrode terminal 16 was once folded to extend toward the electrode group 1 from the connecting portion at which the negative electrode terminal 16 was connected to the negative electrode current collector lead section 4c and, then, bent in the opposite direction so as to be drawn to the outside through the clearance between the shorter side sealed portion 9c and the lid 11. The negative electrode terminal 16 thus obtained was shaped substantially like a letter S.

The height of the S-shaped edge portion of each of the positive electrode terminal 15 and the negative electrode terminal 16 was found to be 2.0 mm.

Each of the areas $S_2$ and $S_3$ was found to be 44 mm² when calculated on the basis that the height of the S-shaped edge portion of the positive electrode terminal 15 was regarded as $t_2$ and the height of the S-shaped edge portion of the negative electrode terminal 16 was regarded as $t_3$. It follows that the areas $S_2$ and $S_3$ were: $S_2=0.13S_p$; $S_3=0.13S_n$. Also, the sizes $t_1$, $t_2$ and $t_3$ had a relationship of: $t_2=t_3=0.4t_1$.

COMPARATIVE EXAMPLE 3

A nonaqueous electrolyte battery was assembled as in Example 1, except that each of the width $W_2$ of the positive electrode terminal and the width $W_3$ of the negative electrode terminal was set at 15 mm, that each the rising size $t_2$ of the positive electrode terminal and the rising size $t_3$ of the negative electrode terminal was set at 4.75 mm, and that each of the areas $S_2$ and $S_3$ was set at 71 mm².

COMPARATIVE EXAMPLE 4

A nonaqueous electrolyte battery was assembled as in Example 1, except that each of the width $W_2$ of the positive electrode terminal and the width $W_3$ of the negative electrode terminal was set at 15 mm, that each of the rising size $t_2$ of the positive electrode terminal and the rising size $t_3$ of the negative electrode terminal was set at 2.5 mm, and that each of the areas $S_2$ and $S_3$ was set at 38 mm².

COMPARATIVE EXAMPLE 5

A nonaqueous electrolyte battery was assembled as in Example 5, except that the positive electrode terminal and the negative electrode terminal were shaped as described in Comparative Example 1.

COMPARATIVE EXAMPLE 6

A nonaqueous electrolyte battery was assembled as in Example 5, except that the positive electrode terminal and the negative electrode terminal were shaped as described in Comparative Example 2.

Comparative Example 7

A nonaqueous electrolyte battery was assembled as in Example 5, except that each of the width $W_2$ of the positive electrode terminal and the width $W_3$ of the negative electrode terminal was set at 15 mm, that each of the rising size $t_2$ of the positive electrode terminal and the rising size $t_3$ of the negative electrode terminal was set at 2.5 mm, and that each of the areas $S_2$ and $S_3$ was set at 38 mm².

COMPARATIVE EXAMPLE 8

A positive electrode and a negative electrode were manufactured and an electrode group was assembled as in Example 9. Also, the positive electrode terminal and the negative electrode terminal were shaped as in Comparative Example 1. Then, a nonaqueous electrolyte battery was assembled as in Example 9 in the other process.

An initial charging and an initial discharging were applied to the nonaqueous electrolyte battery manufactured in each of Examples 1 to 6, Examples 9 to 14, and Comparative Examples 1 to 8 under the conditions described in the following. Specifically, the initial charging was applied for 10 hours under the constant voltage of 2.8 V and the constant current of 0.2C and under the temperature of 45° C. The initial discharging was performed at 25° C. under the constant current of 0.2C until the battery voltage was lowered to 1.5 V. Further, the battery was charged at 25° C. for 3 hours under the constant voltage of 2.8 V and the constant current of 1C, followed by discharging the battery under the constant current of 1C until the battery voltage was lowered to 1.5 V. The charge-discharge cycle described above was repeatedly performed 10 times so as to confirm whether or not an abnormality was found in the battery.

The initial charging and the initial discharging were applied to the nonaqueous electrolyte battery for each of Examples 7 and 8 under the conditions described in the following. Specifically, the initial charging was performed at 45° C. for 10 hours under the constant voltage of 4.2 V and the constant current of 0.2C. Also, the initial discharging was performed at 25° C. under the constant current of 0.2C until the battery voltage was lowered to 3.0 V. Further, the charge-discharge cycle test was performed such that the battery was charged at 25° C. for 3 hours under the constant voltage of 4.2 V and the constant current of 1C, followed by discharging the battery under the constant current of 1C until the battery voltage was lowered to 3.0 V. The charge-discharge cycle described above was repeated 10 times so as to confirm whether or not an abnormality was found in the battery.

A dropping test was conducted as a method of evaluating the reliability of the manufactured nonaqueous electrolyte battery.

The discharge end voltage was set at 1.5 V for the nonaqueous electrolyte battery for each of Examples 1 to 6, Examples 9 to 14 and Comparative Examples 1 to 8 and at 3.0 V for the nonaqueous electrolyte battery for each of Examples 7 and 8, and the manufactured nonaqueous electrolyte battery was discharged at 25° C. under the constant current of 1C until the discharge end voltage was reached.

In the next step, a double-coated tape (No. 665 manufactured by Sumitomo 3M K.K.) was attached to the entire region of that portion of the case which corresponded to the surface of the battery having the largest area, and the battery was fixed to the center of a polypropylene plate sized at 200 mm×200 mm and having a thickness of 10 mm. Further, a polyester adhesive tape (No. 315 manufactured by Nitto Denko K.K.) was attached to the battery in manner to cover the upper surface of the battery disposed on the polypropylene plate so as to fix firmly the battery to the polypropylene plate.

The open circuit voltage and the AC impedance at 1 kHz were measured in respect of the battery before the dropping test.

Concerning the battery for each of Examples 1 to 4, 7, 9 to 14 and Comparative Examples 1 to 4 and 8, in which the positive electrode terminal and the negative electrode terminal were drawn from the case in opposite directions, the battery was dropped first from a prescribed height onto a concrete floor under the state that the positive electrode terminal was positioned to face downward, followed by dropping again the battery from the same height with the negative electrode terminal positioned to face downward. The procedures for dropping the battery under the state that the positive electrode terminal was positioned to face downward and under the state that the negative electrode terminal was positioned to face downward were performed as a set. Also, concerning the battery for each of Examples 5, 6, 8 and Comparative Examples 5 to 7, in which the positive electrode terminal and the negative electrode terminal were drawn in the same direction, the battery was dropped first from a prescribed height onto a concrete floor under the state that both the positive electrode terminal and negative electrode terminal were positioned to face downward, followed by dropping the battery under the state that both the positive electrode terminal and the negative electrode terminal were positioned to face upward. The procedures for dropping the battery with both the positive electrode terminal and the negative electrode terminal positioned to face downward or upward were performed as a set.

After the battery was dropped from a height of 9 fm, the open circuit voltage and the AC impedance of the battery were measured. The measurement was repeated while increasing the dropping height by 9 fm every time the measurement was performed. If an increase of the impedance was not observed at the time when the open circuit voltage was lowered by 10 mV or more, the internal short circuit was regarded as having been generated. Also, the current path was regarded as having been broken at the time when the impedance was increased by at least 10%. Five cells were prepared for each of the Examples and the Comparative Examples, and the dropping height at the time when the internal short circuit and the breakage of the current path were generated was measured so as to obtain the average value, with the result as shown in Table 2.

A vibration test was performed as a second method of evaluating the reliability of the battery. Cells fixed to resin plates were prepared as in the dropping test and fixed to a vibration testing apparatus. In this vibration test, the vibration in which a frequency of 1 to 500 Hz and an acceleration of 1 to 12 G were swept in one minute was continuously applied to the battery in each of x, y and z directions so as to measure the open circuit voltage and the AC impedance every one hour. The particular procedure was repeatedly applied to 5 cells for each of the Examples and the Comparative Examples so as to measure the vibrating time leading to the generation of the internal short circuit and the breakage of the current path, thereby obtaining the average value of the vibrating time. The result of the vibration test is also shown in Table 2.

TABLE 1

| | Shapes of positive electrode terminal and negative electrode terminal | Power generating element | Withdrawing directions of positive electrode terminal and negative electrode terminal | Material of positive electrode terminal | Material of negative electrode terminal | $S_2/S_p$ | $S_3/S_n$ | $t_2/t_1$ | $t_3/t_1$ | $W_2/W_1$ | $W_3/W_1$ |
|---|---|---|---|---|---|---|---|---|---|---|---|
| Example 1 | Substantially U-shaped | Lamination Type | Opposite directions | Al | Al | 0.3 | 0.3 | 0.95 | 0.95 | 0.32 | 0.32 |
| Example 2 | Substantially U-shaped | Lamination type | Opposite directions | Al | Al | 0.5 | 0.5 | 0.95 | 0.95 | 0.53 | 0.53 |
| Example 3 | Substantially U-shaped | Lamination type | Opposite directions | Al | Al | 0.8 | 0.8 | 0.95 | 0.95 | 0.84 | 0.84 |
| Example 4 | Substantially U-shaped | Lamination type | Opposite directions | Al | Al | 0.3 | 0.3 | 0.5 | 0.5 | 0.60 | 0.60 |
| Example 5 | Substantially U-shaped | Lamination type | Same direction | Al | Al | 0.3 | 0.3 | 0.95 | 0.95 | 0.32 | 0.32 |
| Example 6 | Substantially U-shaped | Lamination type | Same direction | Al | Al | 0.3 | 0.3 | 0.7 | 0.7 | 0.43 | 0.43 |
| Example 7 | Substantially U-shaped | Lamination type | Opposite directions | Al | Ni | 0.3 | 0.3 | 0.95 | 0.95 | 0.32 | 0.32 |
| Example 8 | Substantially U-shaped | Lamination type | Same direction | Al | Ni | 0.3 | 0.3 | 0.95 | 0.95 | 0.32 | 0.32 |
| Example 9 | Substantially U-shaped | Winding type | Opposite directions | Al | Al | 0.3 | 0.3 | 0.95 | 0.95 | 0.32 | 0.32 |

TABLE 1-continued

| | Shapes of positive electrode terminal and negative electrode terminal | Power generating element | Withdrawing directions of positive electrode terminal and negative electrode terminal | Material of positive electrode terminal | Material of negative electrode terminal | $S_2/S_p$ | $S_3/S_n$ | $t_2/t_1$ | $t_3/t_1$ | $W_2/W_1$ | $W_3/W_1$ |
|---|---|---|---|---|---|---|---|---|---|---|---|
| Example 10 | Substantially U-shaped | Lamination type | Opposite directions | Al | Al | 0.25 | 0.25 | 0.95 | 0.95 | 0.26 | 0.26 |
| Example 11 | Substantially U-shaped | Lamination type | Opposite directions | Al | Al | 1 | 1 | 1 | 1 | 1.00 | 1.00 |
| Example 12 | Substantially U-shaped | Lamination type | Opposite directions | Al | Al | 0.3 | 0.3 | 0.9 | 0.9 | 0.33 | 0.33 |
| Example 13 | Substantially U-shaped | Lamination type | Opposite directions | Al | Al | 0.3 | 0.3 | 1 | 1 | 0.30 | 0.30 |
| Example 14 | Substantially U-shaped | Lamination type | Opposite directions | Al alloy | Al alloy | 0.3 | 0.3 | 0.95 | 0.95 | 0.32 | 0.32 |
| Comparative Example 1 | Straight | Lamination type | Opposite directions | Al | Al | 0.06 | 0.06 | 0.2 | 0.2 | 0.30 | 0.30 |
| Comparative Example 2 | Substantially S-shaped | Lamination type | Opposite directions | Al | Al | 0.13 | 0.13 | 0.4 | 0.4 | 0.33 | 0.33 |
| Comparative Example 3 | Substantially U-shaped | Lamination type | Opposite directions | Al | Al | 0.2 | 0.2 | 0.95 | 0.95 | 0.21 | 0.21 |
| Comparative Example 4 | Substantially U-shaped | Lamination type | Opposite directions | Al | Al | 0.11 | 0.11 | 0.5 | 0.5 | 0.22 | 0.22 |
| Comparative Example 5 | Straight | Lamination type | Same direction | Al | Al | 0.06 | 0.06 | 0.2 | 0.2 | 0.30 | 0.30 |
| Comparative Example 6 | Substantially S-shaped | Lamination type | Same direction | Al | Al | 0.13 | 0.13 | 0.4 | 0.4 | 0.33 | 0.33 |
| Comparative Example 7 | Substantially U-shaped | Lamination type | Same direction | Al | Al | 0.11 | 0.11 | 0.95 | 0.95 | 0.12 | 0.12 |
| Comparative Example 8 | Straight | Winding type | Opposite directions | Al | Al | 0.06 | 0.06 | 0.2 | 0.2 | 0.30 | 0.30 |

TABLE 2

| | Dropping height causing short circuit (m) | Dropping height causing current path breakage (m) | Vibration time (hours) causing short circuit | Vibration time (hours) causing current path breakage |
|---|---|---|---|---|
| Example 1 | 1.62 | 1.81 | >10 | >10 |
| Example 2 | >2.1 | 2.1 | >10 | >10 |
| Example 3 | >2.22 | 2.22 | >10 | >10 |
| Example 4 | 1.65 | 1.85 | >6.5 | 6.5 |
| Example 5 | >1.66 | 1.66 | >10 | >10 |
| Example 6 | >1.62 | 1.62 | >6.2 | 6.2 |
| Example 7 | >1.59 | 1.59 | >10 | >10 |
| Example 8 | >1.45 | 1.45 | >10 | >10 |
| Example 9 | 1.62 | 1.81 | >10 | >10 |
| Example 10 | 1.45 | 1.66 | >10 | >10 |
| Example 11 | >2.3 | 2.3 | >10 | >10 |
| Example 12 | 1.6 | 1.75 | >10 | >10 |
| Example 13 | 1.65 | 1.8 | >10 | >10 |
| Example 14 | 1.55 | 1.65 | >10 | >10 |
| Comparative Example 1 | 0.48 | 0.71 | >2.1 | 2.1 |
| Comparative Example 2 | 0.62 | 1.65 | >2.0 | 2.0 |
| Comparative Example 3 | 0.78 | 1.67 | >7.6 | 7.6 |
| Comparative Example 4 | 0.72 | 1.63 | >6.2 | 6.2 |
| Comparative Example 5 | 0.52 | 0.66 | >2.5 | 2.5 |
| Comparative Example 6 | 0.66 | 1.15 | >2.2 | 2.2 |
| Comparative Example 7 | 0.68 | 1.45 | >6.4 | 6.4 |
| Comparative Example 8 | 0.55 | 0.63 | >2.1 | 2.1 |

As shown in Tables 1 and 2, the height of the dropping test causing the internal short circuit of the battery was high in the secondary battery for each of Examples 1 to 14, compared with the secondary battery for each of Comparative Examples 1 to 8.

In the secondary battery for each of Comparative Examples 1, 5 and 8, in which the electrode terminal extended substantially horizontal from the connecting portion between the electrode terminal and the current collector lead section to the sealed portion, the internal short circuit was generated at the dropping height of the battery lower than that for the battery of the Examples. In addition, in the secondary battery for each of Comparative Examples 1, 5 and 8, the dropping height of the battery causing the breakage of the current path was also lower than that for the battery of the Examples. Further, the internal short circuit and the breakage of the current path were also generated easily in the vibration test in the batteries for the Comparative Examples noted above. In the battery for each of Comparative Examples 2 and 6, in which the electrode terminals were bent substantially in a S-shape as a whole as in Jpn. Pat. Appln. KOKAI No. 2000-215877 quoted previously, the internal short circuit was generated at the dropping height of the battery lower than that for the battery of the Examples. Also, the internal short circuit and the breakage of the current path were also generated easily in the vibration test in the battery for each of Comparative Examples 2 and 6.

In the battery for each of Comparative Examples 3, 4 and 7, in which the area $S_2$ was smaller than $0.25S_p$ and the area $S_3$ was smaller than $0.25S_n$, the internal short circuit was generated at the dropping height of the battery lower than that for the battery of each of the Examples.

The effect produced by the relationship of the sizes $t_1$, $t_2$ and $t_3$ can be recognized by the comparison among the secondary batteries for Examples 4 to 6. To be more specific, the experimental data clearly support that, in the secondary battery for Example 5, which satisfied the formulas (3) and (4) described previously, the internal short circuit and the breakage of the current path were unlikely to be generated over a long vibrating time. It follows that it is desirable to satisfy the formulas (3) and (4) in order to improve the reliability and the safety of the secondary battery against the vibration.

Further, it can be understood by the comparison among the secondary batteries for Examples 1, 5, 7, 8 and 14 that it is desirable for each of the positive electrode terminal and the negative electrode terminal to be formed of aluminum or an aluminum alloy. To be more specific, in the secondary battery for each of Examples 1, 5 and 14, in which each of the positive electrode terminal and the negative electrode terminal was formed of aluminum or an aluminum alloy, the internal short circuit and the breakage of the current path were unlikely to be generated in the dropping test of the secondary battery. On the other hand, in the secondary battery for each of Examples 7 and 8, in which the negative electrode terminal was formed of nickel, the negative electrode terminal was easily stuck against the electrode group when an impact was applied to the battery by the dropping of the battery.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery, comprising:
   a flattened electrode group including a positive electrode and a negative electrode, the positive electrode including a positive electrode current collector, and the negative electrode including a negative electrode current collector;
   a case having the electrode group housed therein and including a sealed portion in at least a part of a periphery;
   a positive electrode current collector lead section formed of a part of the positive electrode current collector;
   a negative electrode current collector lead section formed of a part of the negative electrode current collector;
   a positive electrode terminal having one edge portion electrically connected to the positive electrode current collector lead section and the other edge portion, the positive electrode terminal being bent in a first U-shape around the one edge portion of the positive electrode terminal, curved in a second U-shape toward the electrode group to reach the sealed portion wherein the two U-shaped portions are connected to form an S-shape, and the other edge portion of the positive electrode terminal extending from the case through the sealed portion; and
   a negative electrode terminal having one edge portion electrically connected to the negative electrode current collector lead section and the other edge portion, the negative electrode terminal being bent in a first U-shape around the one edge portion of the negative electrode terminal, curved in a second U-shape toward the electrode group to reach the sealed portion wherein the two U-shaped portions are connected to form an S-shape, and the other edge portion of the negative electrode terminal extending from the case through the sealed portion;
   wherein the positive electrode terminal satisfies formula (1) given below and the negative electrode terminal satisfies formula (2) given below:

$$t_2 \times W_2 \geq 0.25 S_p \quad (1)$$

$$t_3 \times W_3 \geq 0.25 S_n \quad (2)$$

where $S_p$ denotes a cross-sectional area of the electrode group that is obtained when the electrode group is cut along a plane perpendicular to an extending direction of the positive electrode terminal, $t_2$ denotes a total height of the positive electrode terminal including the U-shaped curve in a direction perpendicular to an electrode reaction surface of the electrode group, $W_2$ denotes a width of the positive electrode terminal, $S_n$ denotes a cross-sectional area of the electrode group that is obtained when the electrode group is cut along a plane perpendicular to an extending direction of the negative electrode terminal, $t_3$ denotes a total height of the negative electrode terminal including the U-shaped curve in a direction perpendicular to the electrode reaction surface of the electrode group, and $W_3$ denotes a width of the negative electrode terminal wherein the positive electrode terminal satisfies formula (3) given below and the negative electrode terminal satisfies formula (4) given below:

$$0.9 t_1 \geq t_2 \geq t_1 \quad (3)$$

$$0.9 t_1 \geq t_3 \geq t_1 \quad (4)$$

where $t_1$ denotes a thickness of the electrode group, $t_2$ denotes the height of the positive electrode terminal in the direction perpendicular to the electrode reaction surface, and $t_3$ denotes the height of the negative electrode terminal in the direction perpendicular to the electrode reaction surface.

2. The nonaqueous electrolyte battery according to claim 1, wherein the extending direction of the negative electrode terminal is opposite to the extending direction of the positive electrode terminal.

3. The nonaqueous electrolyte battery according to claim 2, wherein the positive electrode terminal satisfies formula (5) given below and the negative electrode terminal satisfies formula (6) given below:

$$0.25 W_1 \leq W_2 \leq W_1 \quad (5)$$

$$0.25 W_1 \leq W_3 \leq W_1 \quad (6)$$

where $W_1$ denotes a width of the electrode group defined by a length of the electrode group in a direction perpendicular to the extending direction of the positive electrode terminal or the negative electrode terminal, $W_2$ denotes the width of the positive electrode terminal, and $W_3$ denotes the width of the negative electrode terminal.

4. The nonaqueous electrolyte battery according to claim 2, comprising hollow first and second insulating spacers each having a terminal insertion hole;
   wherein:
   the case has first and second inner surfaces parallel to the electrode reaction surface of the electrode group;
   the first insulating spacer is arranged between the first inner surface and the second inner surface and surrounds the positive electrode terminal, and the other edge portion of the positive electrode terminal is extended from the case through the terminal insertion hole of the first insulating spacer; and
   the second insulating spacer is arranged between the first inner surface and the second inner surface and surrounds the negative electrode terminal, and the other edge portion of the negative electrode terminal is extended from the case through the terminal insertion hole of the second insulating spacer.

5. The nonaqueous electrolyte battery according to claim 1, wherein the extending direction of the negative electrode terminal is equal to the extending direction of the positive electrode terminal.

6. The nonaqueous electrolyte battery according to claim 5, wherein the positive electrode terminal satisfies formula (7) given below and the negative electrode terminal satisfies formula (8) given below:

$$0.25W_1 \leq W_2 < 0.5W_1 \quad (7)$$

$$0.25W_1 \leq W_3 < 0.5W_1 \quad (8)$$

where $W_1$ denotes a width of the electrode group defined by a length of the electrode group in a direction perpendicular to the extending direction of the positive electrode terminal or the negative electrode terminal, $W_2$ denotes the width of the positive electrode terminal, and $W_3$ denotes the width of the negative electrode terminal.

7. The nonaqueous electrolyte battery according to claim 1, further comprising insulating members interposed between the positive electrode terminal and the case and between the negative electrode terminal and the case.

8. The nonaqueous electrolyte battery according to claim 7, wherein the insulating member is formed of an insulating spacer or an insulating tape.

9. The nonaqueous electrolyte battery according to claim 1, wherein the positive electrode current collector is held between a bent section of the positive electrode terminal, and the negative electrode current collector is held between a bent section of the negative electrode terminal.

10. The nonaqueous electrolyte battery according to claim 1, wherein the case comprises a container and a lid, the container having an open section and a joining section which joins the lid to the container and is formed in at least a part of a periphery of the open section, and the positive electrode terminal and the negative electrode terminal are drawn from the case through clearances between the joining section of the container and the lid.

11. The nonaqueous electrolyte battery according to claim 1, wherein each of the positive electrode terminal and the negative electrode terminal is formed of aluminum or an aluminum alloy.

12. The nonaqueous electrolyte battery according to claim 1, wherein the negative electrode contains lithium-titanium oxide.

13. The nonaqueous electrolyte battery according to claim 12, wherein the lithium-titanium oxide has a spinel structure.

14. The nonaqueous electrolyte battery according to claim 1, wherein each of the positive electrode current collector and the negative electrode current collector is formed of aluminum having an average crystal grain diameter not larger than 50 μm or an aluminum alloy having an average crystal grain diameter not larger than 50 μm.

* * * * *